(12) United States Patent
Renshaw et al.

(10) Patent No.: US 11,668,893 B2
(45) Date of Patent: Jun. 6, 2023

(54) IMAGING-BASED TRANSMITTER FOR FREE-SPACE OPTICAL COMMUNICATIONS

(71) Applicant: University of Central Florida Research Foundation, Inc., Orlando, FL (US)

(72) Inventors: Christopher Kyle Renshaw, Oviedo, FL (US); Sajad Saghaye Polkoo, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 402 days.

(21) Appl. No.: 16/417,464

(22) Filed: May 20, 2019

(65) Prior Publication Data
US 2019/0353868 A1 Nov. 21, 2019

Related U.S. Application Data

(60) Provisional application No. 62/673,410, filed on May 18, 2018.

(51) Int. Cl.
*G02B 7/02* (2021.01)
*G02B 27/09* (2006.01)
(Continued)

(52) U.S. Cl.
CPC ......... *G02B 7/021* (2013.01); *G02B 27/0955* (2013.01); *G02B 27/30* (2013.01); *H04N 23/55* (2023.01); *H04N 25/40* (2023.01)

(58) Field of Classification Search
CPC .............. G03B 21/208; G03B 21/2033; G03B 21/2013; G03B 33/12; G03B 21/2073; G03B 21/13; G03B 21/142; G03B 21/145; G03B 21/16; G03B 21/2066; G03B 21/20; H04N 9/3114; H04N 9/3155; H04N 9/3167; H04N 5/7441; H04N 9/3111; H04N 9/315; H04N 9/3164; H04N 21/41415; H04N 5/2254; H04N 5/341; H04N 5/74;
(Continued)

(56) References Cited

U.S. PATENT DOCUMENTS 9,800,332 B2   10/2017   Shalfant
2011/0242532 A1 *  10/2011   McKenna .................. D04H 3/14
                                            356/319

(Continued)

*Primary Examiner* — Brandi N Thomas
(74) *Attorney, Agent, or Firm* — Suiter Swantz pc llo

(57) ABSTRACT

An imaging transmitter (Tx) for free-space optical communications (FOC) includes a light source for providing modulated light, a pixel controller configured for dynamic selection of at least a portion of the modulated light to provide at least one pre-collimated FOC beam. An imaging lens assembly is for collimating the pre-collimated FOC beam to provide a transmitted FOC beam. The pixel controller controls a location of the pre-collimated FOC beam with respect to a focal surface of the imaging lens assembly so that the transmitted FOC beam is projected into a desired direction in object space that is determined by the location, or in the case that the light source is an emitting array, equivalently the transmitted FOC beam is projected into a unique angular volume described by the center line-of-sight (LOS) and instantaneous FOV (iFOV) of the emitting pixel(s) in the array.

18 Claims, 20 Drawing Sheets

(51) Int. Cl.
  *G02B 27/30* (2006.01)
  *H04N 23/55* (2023.01)
  *H04N 25/40* (2023.01)

(58) Field of Classification Search
  CPC .. H04N 9/3102; H04N 9/3105; H04N 9/3147; H04N 5/84
  See application file for complete search history.

(56) References Cited

U.S. PATENT DOCUMENTS

2017/0109115 A1\* 4/2017 Fan ....................... G06F 1/1639
2017/0351042 A1\* 12/2017 Campbell ............ G02B 6/1221

\* cited by examiner

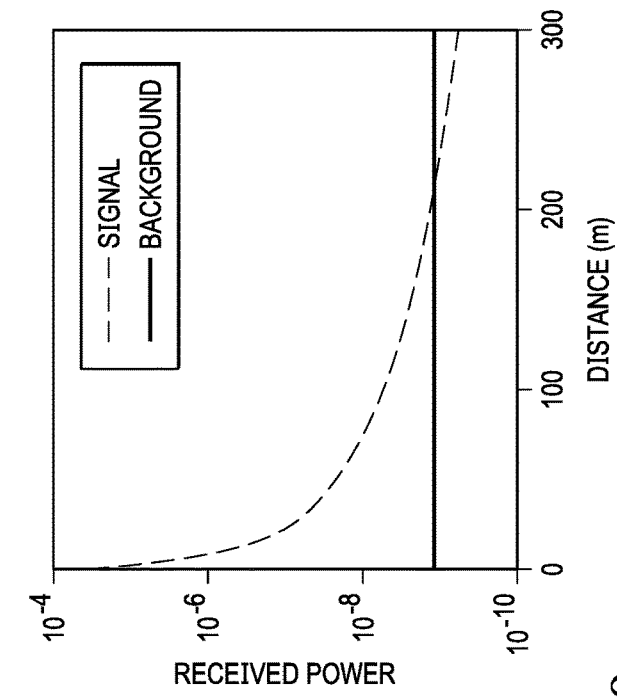
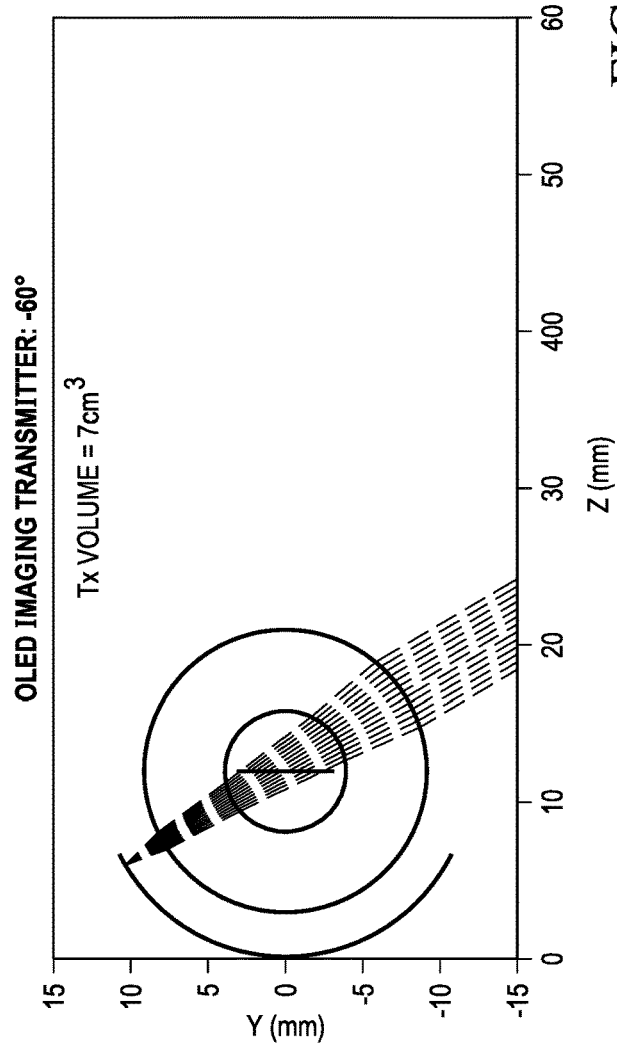
FIG. 9

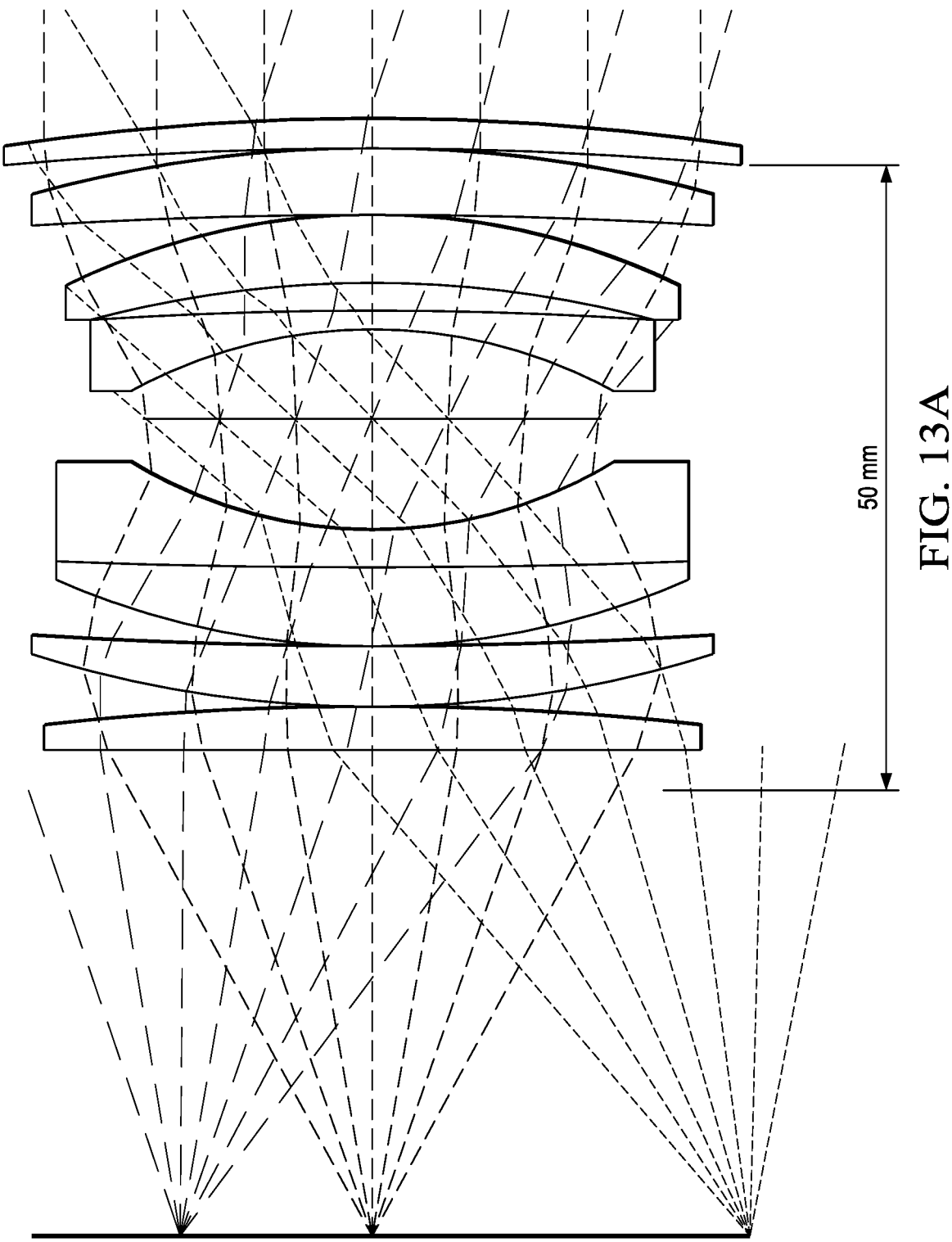

IMAGING-BASED TRANSMITTER FOR FREE-SPACE OPTICAL COMMUNICATIONS

CROSS REFERENCE TO RELATED APPLICATIONS

This application claims the benefit of Provisional Application Ser. No. 62/673,410 entitled "IMAGING-BASED TRANSMITTER AND RECEIVER FOR FREE-SPACE OPTICAL COMMUNICATIONS" filed on May 18, 2018, which is herein incorporated by reference in its entirety.

FIELD

Disclosed embodiments relate to free-space optical communications.

BACKGROUND

Free-space optical communications (FOC) is an emerging technology comprising optical data transmission through free space, usually through air or through a vacuum, rather than through optical fibers. FOC provides robust, secure, power-efficient, and high-bandwidth communications using optical domain carrier frequencies in place of conventional radio frequencies. FOC systems utilize direct line-of-sight (LOS) data links between transmitters and receivers that are immune to jamming and eavesdropping, while minimizing the power-consumption for the link.

The benefits of FOC however come with added cost and complexity associated with the need to steer a narrow transmit beam and receiver field-of-view (FOV) to precisely point the FOC system at a remote transceiver. This is especially impactful when either the host platform or the remote transceiver are mobile. Such applications typically require steering the narrow system FOV over a large field-of-regard (FOR).

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects solve the above-described FOC system problem of cost and complexity previously needed to steer a narrow transmitter beam and receiver FOV to precisely point the transmitter beam at a remote transceiver by providing a believed to be new, relatively simple, robust, and cost-effective solution for LOS control in FOC systems. This Disclosure includes an imaging transmitter (Tx) with dynamic beam shaping implemented by pixel selection operable over a large FOR that is at least 40°, such as at least 80°.

The FOR is generally dependent on the lens system used in the disclosed FOC system, so that a wider FOR that is >40° is generally achievable by a proper choice of a lens system, such as for providing a FOR generally approaching 180° (hemispherical coverage). This LOS control is enabled by disclosed imaging techniques that allow projecting at least one beam in a precise direction over a large FOR. In addition, disclosed Txs allow multiplexed FOC communications using a plurality of different beams each projected into a unique direction in object space that is determined by location of the emitting pixel(s) for each of the beams to support a large number (e.g., 100's) of remote devices simultaneously.

Disclosed beam steering implemented by pixel selection can also be utilized in a receiver (Rx) to dynamically steer a narrow receiver FOV over a large FOR, while retaining high signal to background ratio afforded by spatial filtering in the imaging process. The imaging-based LOS control for FOC transceivers can provide precision pointing over wide FOR to enable compact and low-cost FOC systems with no moving parts and highly multiplexed data links. Disclosed aspects include component technologies including 1) imaging-based LOS control, 2) emitter (for Txs) and photodetector (for Rxs) technologies that enable wide FOR coverage using narrow beams from Txs and wide FOR coverage using photodetectors with small instantaneous field-of-view (iFOV), and 3) optional electronic controls that enable dynamic beam-steering and multiplexed data links.

Disclosed aspects include an imaging Tx for FOC including a modulated light source for providing (high-speed) modulated light (i.e. optical signals). The modulated light source can be directly modulated or modulated by external components. The modulated light source can consist of a single light source or can comprise an emitter array including a two dimensional (2D) array of directly modulated Tx pixels, a pixel controller configured for dynamic selection of at least one emitting pixel from the array of modulated Tx pixels to provide at least one pre-collimated FOC beam, where the Tx pixels are each independently selectable by the pixel controller to be in the pre-collimated FOC beam. An imaging lens assembly is for collimating the pre-collimated FOC beam with respect to a location of the pre-collimated FOC beam with respect to a focal surface of the imaging lens assembly so that the transmitted FOC beam is projected into a desired direction in object space determined by the location, or equivalently for an emitter array the transmitted FOC beam is projected into a unique angular volume described by the center line-of-sight (LOS) and iFOV of the emitting pixel(s). In the case of an electronic pixel controller, the emitting pixels may also be modulated, such as at a frequency of >1 MHz.

One disclosed imaging Tx arrangement comprise an electronic pixel controller, wherein the emitter array comprises a row select line for receiving a row select signal, and a column select line for receiving a column select signal, and wherein the pixel controller comprises control electronics coupled to the emitter array for providing the row select signal and the column select signal. After the collimating, the transmitted FOC beam is projected into a unique desired direction in object space that is determined by the location. Another disclosed arrangement comprises the pixel controller coupled to a modulated light source that need not be an emitter array, where the pixel controller selectively directs at least a portion of the emitted light to one or more locations in the focal plane of the imaging lens assembly which collimates that light into FOC beam(s) steered into conjugate directions corresponding to the selected locations.

BRIEF DESCRIPTION OF THE DRAWINGS

FIGS. 8 and 9 show results of optical modelling using a 640×640 organic light-emitting diode (OLED) emitter array with 40 micron sized pixels emitting between 775 nm to 825 nm, with a 25% internal quantum efficiency and 100 MHz modulation bandwidths.

DETAILED DESCRIPTION

Figure 1:
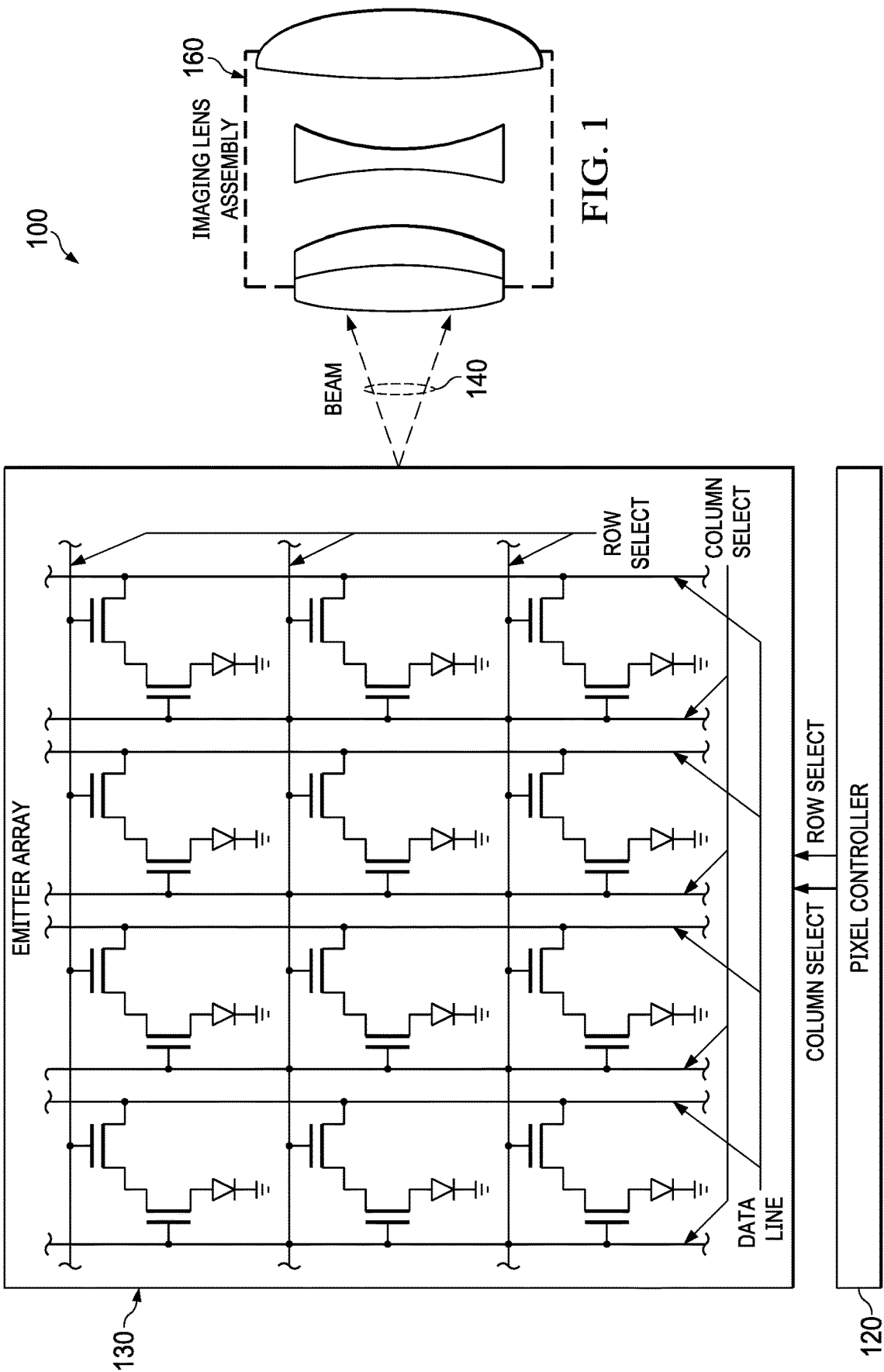
FIG. 1 shows an example imaging Tx including a disclosed pixel controller that provides a column select signal and a row select signal to an emitter array.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1 shows an example imaging Tx 100 including a disclosed pixel controller embodied as an electronic pixel controller 120 that provides a column select signal and a row select signal to the emitter array 130 shown in a highly simplified example having only 12 pixels each shown by example having an LED shown as a diode. The emitter array 130 can comprise an OLED array or a vertical-cavity surface-emitting laser array (VCSEL array).

The column and row select signal provided by the pixel controller 120 are coupled to column select lines and row select lines in the emitter array 130 enables the access transistors shown as metal oxide semiconductor field effect transistors (MOSFETs) shown in each of the pixels to enable selecting specific pixel(s) from the emitter array 130 to provide the pre-collimated FOC beam 140 shown that is directed towards an imaging lens assembly 160. The imaging lens assembly 160 can generally be any combination of lenses that provide a focal length and F-number for the desired pointing precision and throughput when paired with the emitter array 130. The imaging lens assembly 160 is for passively collimating the pre-collimated FOC beam 140 to reduce its divergence along a conjugated line-of-sight (LOS) of the emitting pixel in image space.

The emitter array 130 is positioned at/or close to focal plane of the imaging lens assembly 160, generally within a distance of 100 μm as the positioning the emitter array 130 exactly at focal plane may not be trivial. As known in the art of optics the focal plane is the plane crossing the focal length and perpendicular to optical axis of the lens system, here the imaging lens assembly 160 which is for passively collecting the modulated light from a modulated light source's emitting pixel(s)' optical power and for providing collimation. In the case the source comprises an emitter array, fine adjustment of the emitter array position around the focal plane can reduce the beam divergence for collimating the pre-collimated FOC beam 140 along a conjugated LOS, or equivalently along a LOS that emitter is mapped to a LOS of the emitting pixel. After the focusing the beam by the imaging lens assembly 160, the beam is projected as a transmitted FOC beam into a desired unique direction in object space which is equivalently in the case of an emitter array, projected into a unique angular volume described by the center LOS and iFOV of the emitting pixel(s).

Disclosed emitter arrays 130 are not commercially available; as they have independently addressable pixels capable of high-speed modulation. Disclosed emitter arrays 130 can be fabricated to have independently addressable pixels by having separate interconnects, routing, wiring, and appropriate electronics. For example, pixel logic can include activation (i.e. a digital high signal) of both a row-select and column-select interconnect; this dual selection being able to uniquely designate a specific pixel in the emitter array. Upon designation this specific pixel can be connected to an input signal fed into a column-oriented data line. More complicated control mechanisms can provide more dynamic pixel selection to, for example, allow selecting multiple pixels in the array at a time while connected each one to different data lines. For example, an analog column-select line can used to select a specific pixel along the column by designating discrete voltage levels to each pixel along the column; integrating comparator logic in-pixel to decode bias levels allows activation only if the corresponding bias is applied; if selected, the light source such as a VCSEL or OLED in that pixel would be connected to the column-oriented data line.

Independently addressable differentiates from conventional VCSELs or other light source arrays, while high-speed modulation differentiates from known display technologies. Similarly, disclosed imaging Rxs can be implemented by separating the detection channels of each photodetector's pixel where the pixels can each detect signals independently.

Figure 2:
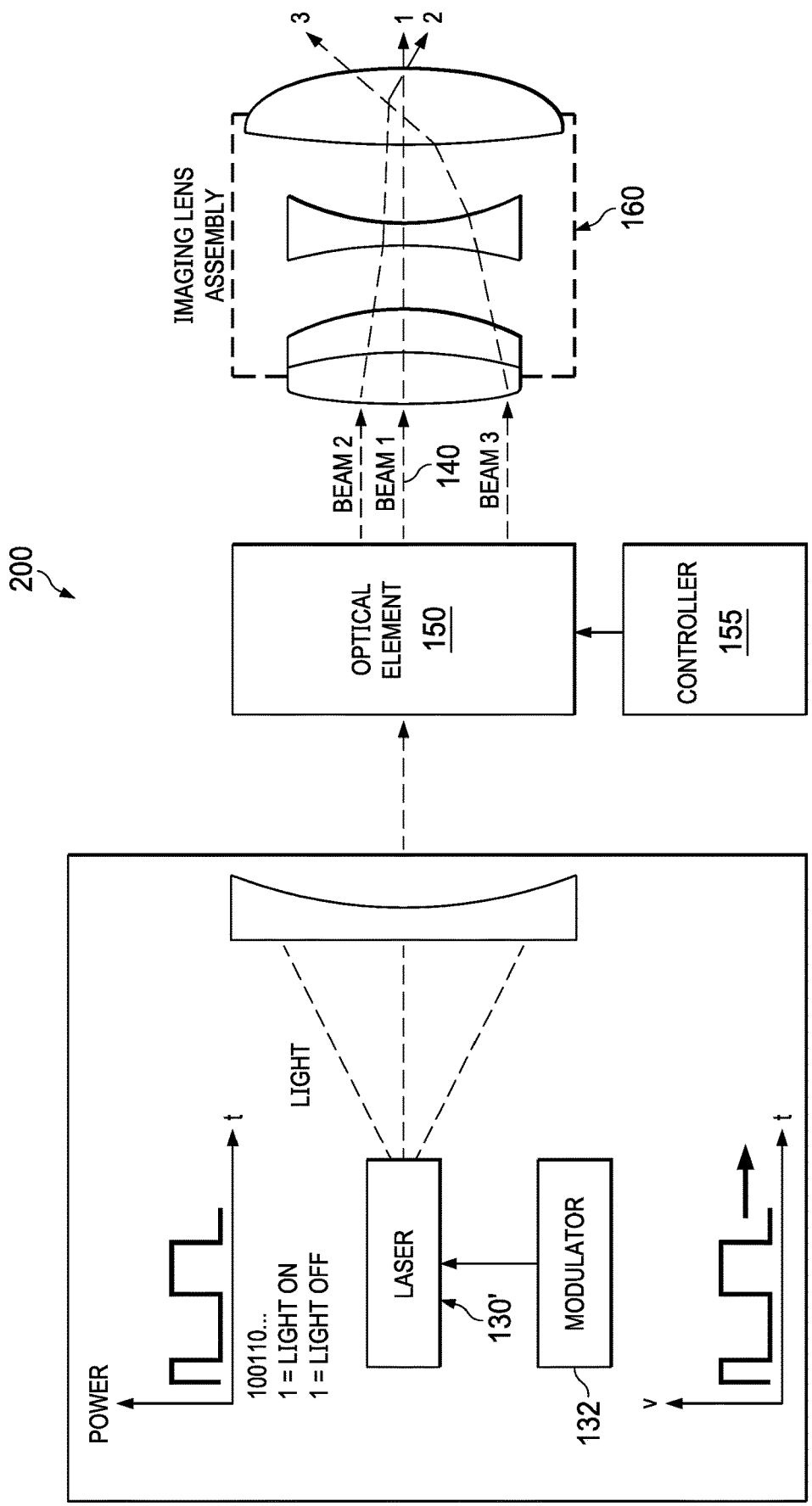
FIG. 2 shows another imaging Tx including a disclosed pixel controller embodied as an optical element.

FIG. 2 shows another imaging Tx 200 including a disclosed pixel controller shown as controller 155 coupled to an optical element 150. As noted above, the optical element 150 can comprise a waveguide structure, steering mirror, or a grating. The modulated light source is now shown as 130' shown as a laser as it can be a single non-pixelated light source, typically a multi-wavelength light source, and thus does not need to have column select and row select lines shown in emitter array 130 in FIG. 1 because the controller 155 controls the optical element 150 with all non-movable elements to function as a pixel generator which selectively directs light from the source 130' to target location(s) in the focal plane of the imaging optic. It is noted that light from the source may be partitioned spectrally, spatially or temporally to define multiple signals that the controller routes to distinct locations in the focal plane for multiplexed communication to multiple devices along multiple LOSs. The light from the light source 130' is shown directly modulated (i.e. its electrical power supply is modulated in time to increase or decrease the amount of emitted light) by a modulating electric signal provided by modulator 132.

In the case of a fast steering mirror (FSM), the LOS can be controlled by the FSM, an in case of a waveguide with gratings, wiring can be used for pixel selection (which in turn selection of LOS). Regarding the controller 155, a steering mirror can be controlled by a computer. A waveguide or grating configuration as the optical element 150 can be controlled by wire bundles rather than electronics circuitry. The wire bundle may finally go to off-chip electronics, which may include an electronic circuit.

Figure 3A:
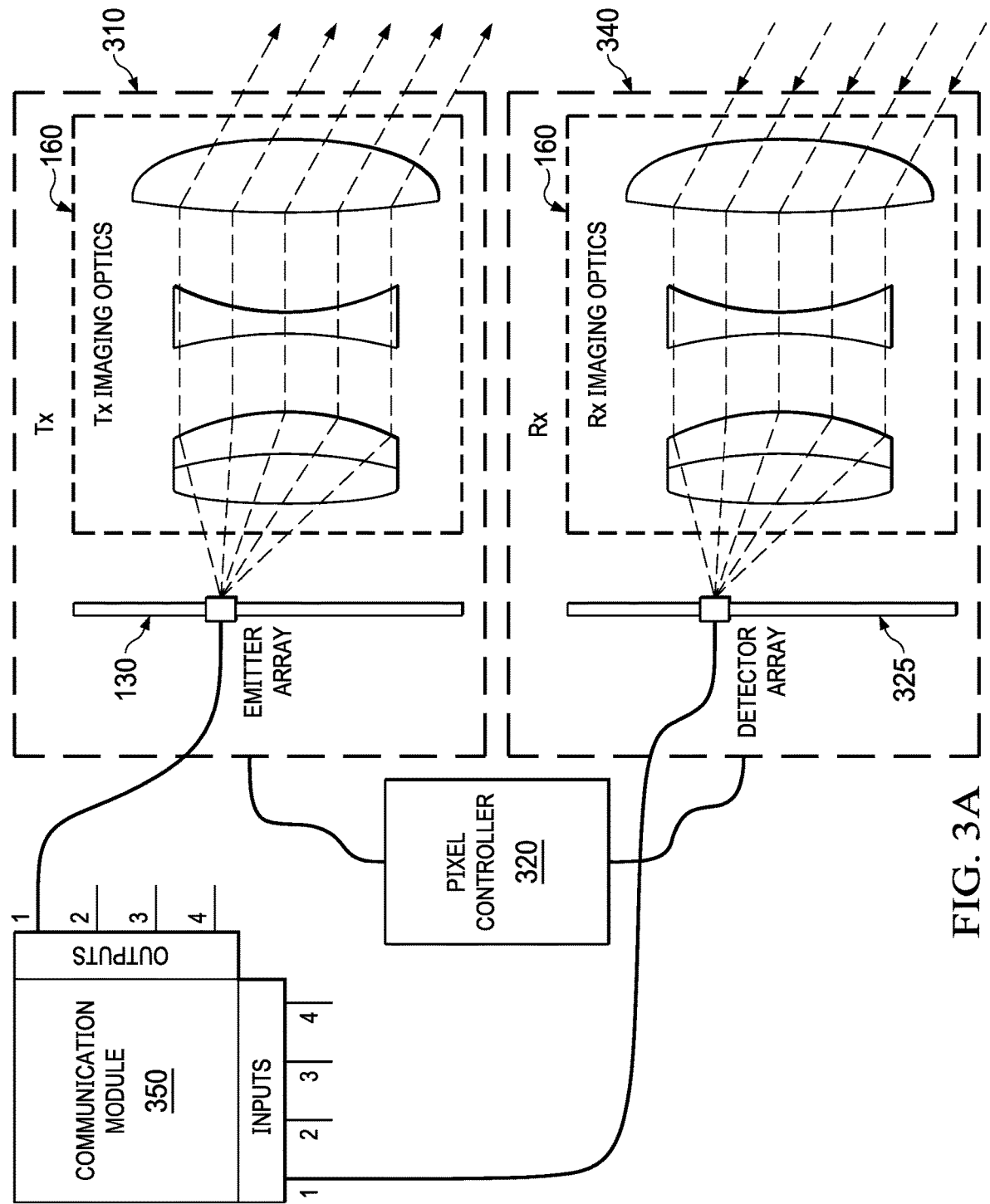
FIG. 3A shows an example imaging Rx comprising a pixelated photodetector and an imaging Tx comprising an emitter array, each positioned at or near the focal surface of a wide FOV lens assembly.

This Disclosure also includes a related imaging Rx. The imaging Rx may be pixelated in an array that is able to detect, receive or reroute the FOC beam(s) coming from a unique LOS. In comparison to conventional image sensors, different electronics are used to control the array of photodetectors independently. Unlike a camera that integrates each photodetector in the pixel and sequentially reads out entire frames, different read-out circuitry (similar to that describe for the Tx above) is used to connect one or more pixels (but less than the total number of pixels in the emitter) to dedicated communication modules that provide signal conditioning, processing and error checking of photodiode outputs directly, without in pixel integration that would degrade the bandwidth of the system. This control circuitry can mimic that described for selecting specific pixels above Imaging Rx and Tx for an FOC system are disclosed that provide high-resolution mapping between object and image space to provide beam-steering or LOS control suitable for compact, low-cost FOC systems. The Rx and Tx comprise pixelated photodetector and emitter arrays, respectively, each positioned at or near the focal surface of a wide field-of-view (FOV) lens assembly which is schematically illustrated in FIG. 3A shown with a pixel controller 320 that includes driving electronics coupled to the emitter array 130 of the imaging Tx 310 and the photodetector array 325 of the imaging Rx 340. The imaging Tx 310 includes emitter array 130 and an imaging lens assembly 160. The Rx 340 includes an imaging lens assembly 160 and a photodetector array 325.

Typically, the imaging lens assembly 160 in the TX and RX are the same, but not necessarily. It may be advantageous to reuse the imaging assembly for both Tx and Rx paths and this can generally easily be done using a beam-splitter between the lens and both Tx and Rx arrays. The beam-splitter splits the optical path in two directions, one to the Tx and another to the Rx; and this can be oriented to generate minimal cross-talk from the Tx directly to the Rx.

The optical system of the imaging Rx 340 can be seen to closely resemble that of a camera which similarly maps the light field in front of the system onto a sensor surface having a plurality of pixels to produce an image of the object space in front of the system. In contrast, the disclosed imaging Tx 310 resembles an "inverse-camera" wherein the emitter array 130 is used in place of the sensor so that the lens projects each emitter pixel into a unique direction in object space.

The photodetector array 325 of the imaging Rx 340 generally comprises an array of small photodetectors (i.e. Rx-pixels) positioned across the focal surface of a wide FOV lens assembly 160. The lens assembly 160 maps each Rx-pixel to a unique area on a distant surface in "object space" or, equivalently, to a unique angular volume described by the center LOS and iFOV of the Rx-pixel. FIG. 3A illustrates the mapping of one particular Rx-pixel (or Tx-pixel) to a specific LOS. This mapping can alternatively be described as a "spatial filter" that filters all of the light incident onto the system aperture into different locations on the focal surface dependent on where the beam originated from.

Although this imaging system geometry is similar to that found in a camera, the imaging Rx 340 differs from a camera in the electronics that measure and process the electrical signals generated in the array. Specifically, the Rx electronics are designed to process signals from a single Rx-pixel (or cluster of adjacent Rx-pixels) at communications relevant speeds (>1 MHz) as part of a single communications channel that could be established with a remote Tx. For multiplexed communications, the electronics can be designed to process signals from a few or a large number of individual Rx-pixels (or cluster of adjacent Rx-pixels) where each Rx-pixel (or pixel cluster) are dedicated for an independent communications channel. This control circuitry does not bear any significant resemblance to the conventional readout integrated circuit (ROIC) of a camera's image sensor, which is in contrast designed to measure analog irradiance levels across the entire collection of Rx-pixels at periodic intervals.

In addition to the spatial filtering, disclosed imaging Rxs can be equipped with spectral filters to select a desired communication band while reducing background contributions from out-of-band sources. Both spatial filtering (by imaging) and spectral filtering (by inserting a spectrally selective element into the system, for example, a colored glass filter) provide powerful mechanisms to reduce the background light coupled into each pixel in the Rx. Only light that falls within the spectral band and iFOV of a pixel contributes to the signal. The dominant background source of concern is generally sunlight, which is characterized at the surface of the earth by the AM1.5G power spectrum.

Considering diffuse reflection of AM1.5G from a white surface that fills the Rx-pixel iFOV and whose normal vector is aligned with the Rx LOS (giving maximum reflection into the Rx-pixel), the background signal in the waveband of 775 nm to 825 nm is on the order of a few to tens of nanowatts. This background can readily be overcome with a low F/# transmitter and receiver that efficiently couple radiant flux to enable communication over distances on the order of 10's to 100's of meters. Electronic filtering or other signal processing can further improve the signal-to-background ratio to improve the communication distance and/or the link integrity.

The emitter array 130 for disclosed Txs generally include an array of small emitters (i.e. Tx-pixels) positioned across the focal surface of a wide FOV lens assembly. Similar to the Rx lens, the Tx imaging lens assembly 160 maps each Tx-pixel to a unique angular volume characterized by a LOS and iFOV that depends on the location of the Tx pixel and the optical system. This mapping provides power-efficient data links by collecting most of the light emitted by each pixel and transferring it into a low-divergence transmitted FOC beam pointed in a desired direction.

Disclosed optical systems resemble a projection display, whereas the driving electronics provide one or more communication channels that can be routed to different Tx-pixels (or clusters of Tx-pixels) in the case of an emitter array 130. While signal routing should generally be done at the emitter array level to provide dynamic routing across the emitter array, and the majority of signal processing and network support including encoding/decoding data, link instantiation and link maintenance can be performed external to the Tx (and Rx) array. Thus the communications electronics and the emitter array 130, in particular, can be implemented independently to facilitate manufacturing and integration of a disclosed Tx.

Figure 3B:
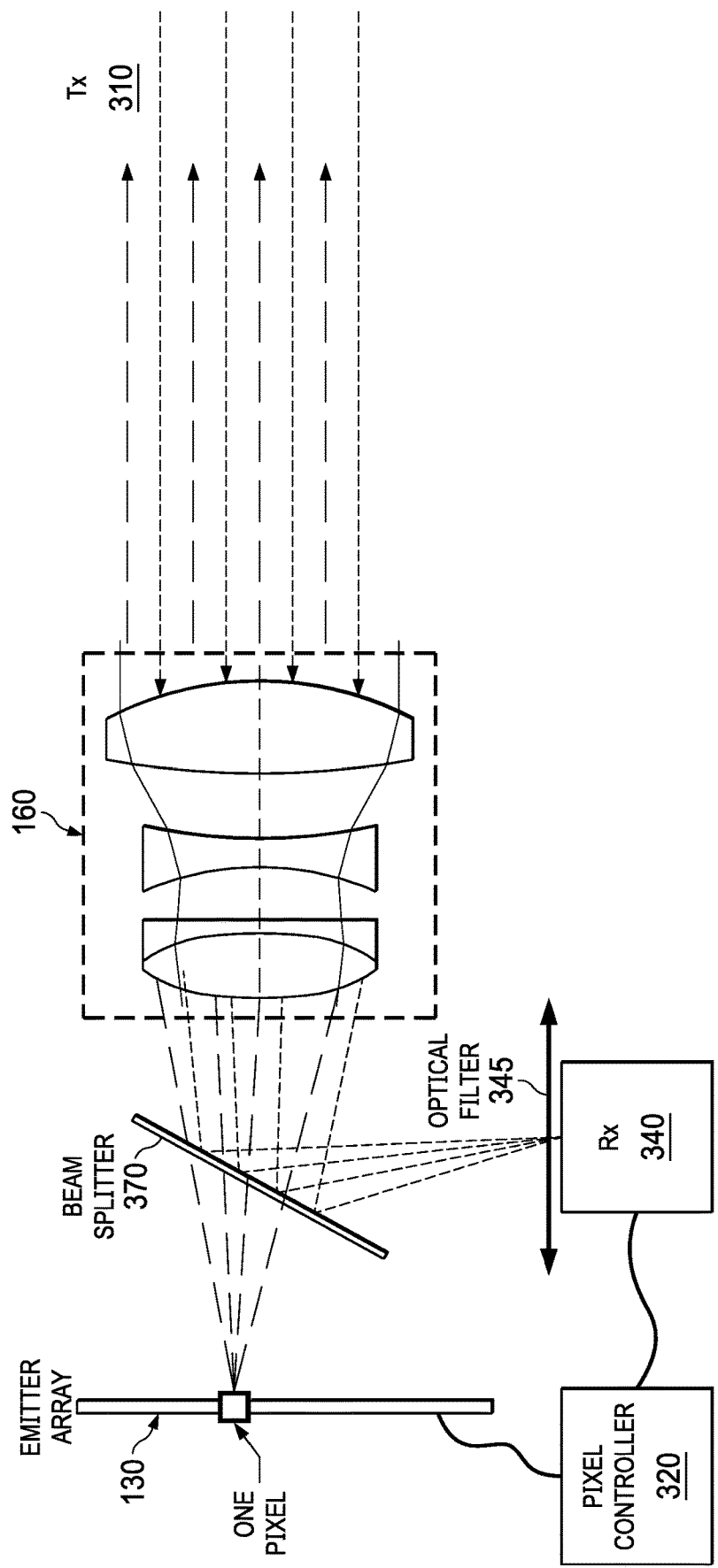
FIG. 3B shows use of a beam-splitter to utilize the same aperture for transmit and receive paths, wherein the beam-splitter is placed between emitter array and the imaging lens assembly.

FIG. 3B shows use of beam-splitter 370 to utilize the same aperture for both transmit and receive paths, wherein the beam-splitter 370 is placed between the emitter array 130 and the imaging lens assembly 160. The beam-splitter 370 can be totally or partially transparent with respect to emitter array 130. The photodetector array of the Rx 340 can placed at a distance defined by difference between the focal length of the imaging lens assembly 160 and the beam-splitter 370, while the beam-splitter 370 can be totally or partially reflective respect to in coming light from other remote Txs. The photodetector may be equipped with an optical filter shown as 345 to provide spectrum filtering in addition to spatial filtering provided by the imaging lens assembly 160.

Figure 3C:
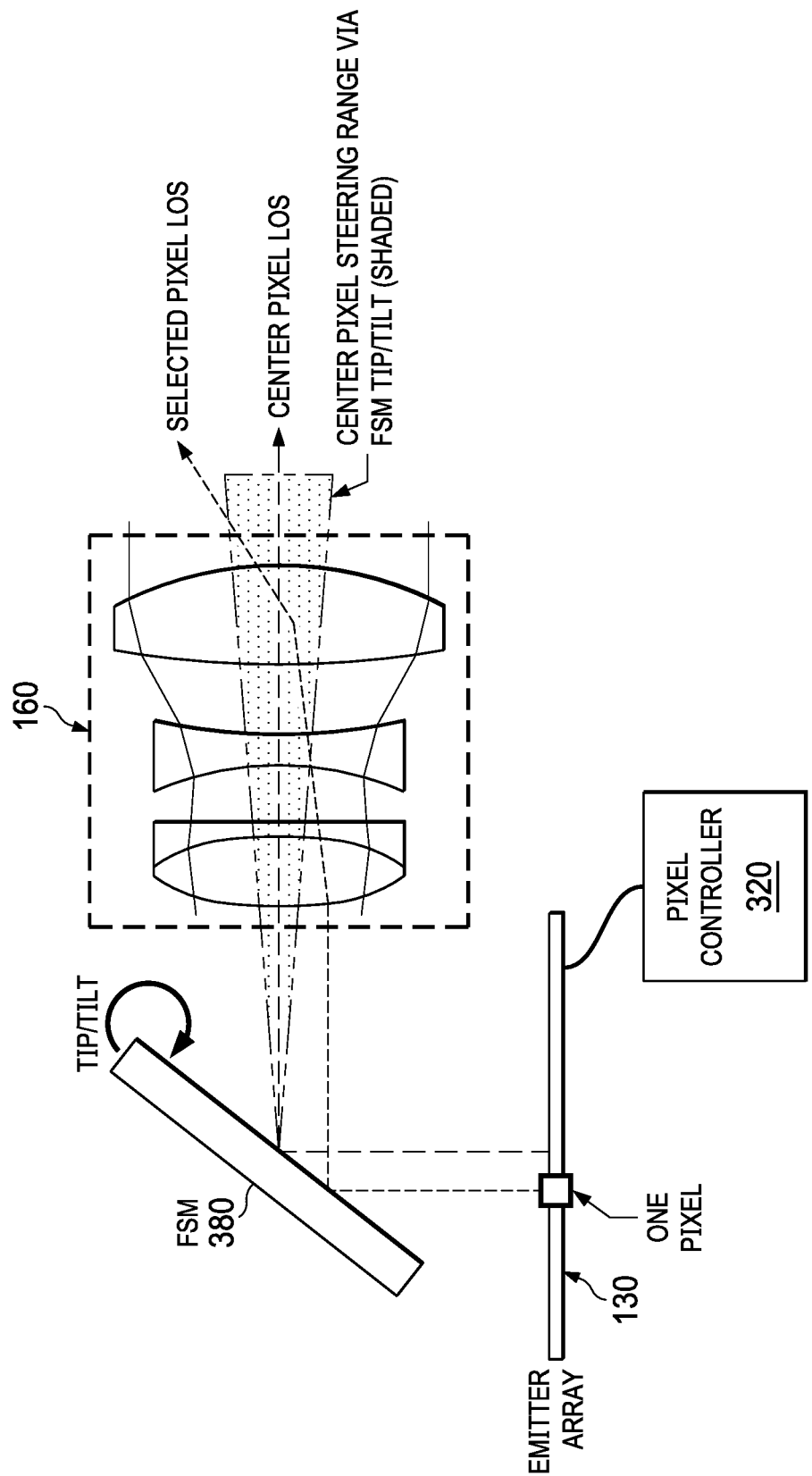
FIG. 3C shows use of a fast-steering mirror positioned the imaging lens assembly and the emitter array which provides coarse LOS selection and the fast steering mirror provides fine LOS pointing control.

FIG. 3C shows use of a fast-steering mirror (FSM) 380 between the imaging lens assembly 160 and the emitter array 130, wherein the emitter array 130 provides coarse LOS selection to cover a large FOR via pixel selection and the FSM 380 provides fine LOS pointing control over a relatively small range comparable to the angular difference between the LOSs of any two adjacent pixels. The geometrical position of the emitter in emitter array 130 thus provides a coarse selection of the LOS while the fast-steering mirror provides the fine adjustment of the LOS. This arrangement allows use of sparse arrays with a relatively small number of pixels to cover a large FOR by using the small steering range typical of FSMs to displace the LOS and fill-in the gaps between pixel LOSs in a sparse array.

Figure 4:
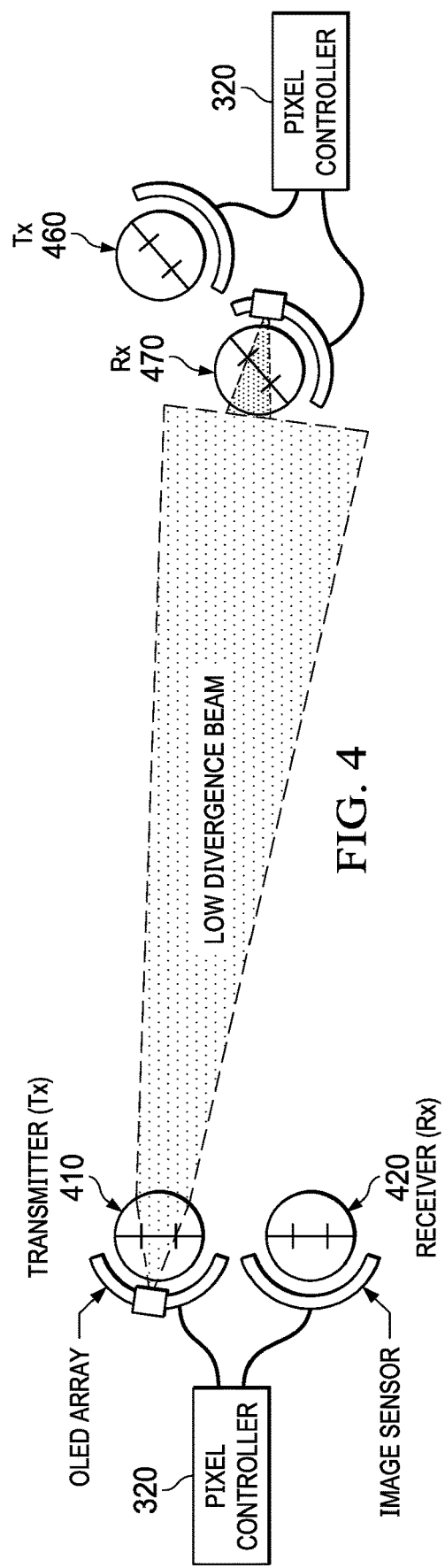
FIG. 4 shows a disclosed imaging Tx and Rx each implemented using non-planar arrays of pixels.

The Tx and Rx described above may be implemented using flat (i.e. planar) arrays of Rx-pixels and Tx-pixels. Alternatively, these components may be implemented using nonplanar arrays of pixels, as illustrated schematically in FIG. 4 as Tx 410 and Rx 420 having pixel controller 320 at one FOC node, and Tx 460 and Rx 470 having a pixel controller 320 another FOC node. Planar emitter and photodetector arrays are readily available and/or easily manufactured using standard semiconductor fabrication processes. These arrays would likely be lower cost and easier to implement, but generally need an optical system with a nearly flat focal surface. Many wide angle lenses are designed to map object space onto a flat focal surface, but these lenses tend to be costly and bulky while providing reduced optical performance (i.e. lower resolution, brightness, etc.) at large field angles. From an optical perspective, it is generally advantageous to employ non-planar pixel arrays. However, fabrication technologies for such arrays may still under development.

Optical modelling and power analysis results indicate that even low-power-density, non-directional light sources such as those used in conventional OLED displays can provide sufficient signal to-background ratios beyond 100 m when the background is dominated by diffuse scattering of sunlight. Arrays of brighter emitters such as inorganic LEDs, vertical-cavity surface-emitting lasers (VCSELs), organic lasers, or other laser sources will enable much high optical powers and longer range data links. Arrays of inorganic LEDs and VCSELs can be monolithically fabricated from a wafer or, to a lesser extent, assembled together to produce arrays generally with ~10 to ~1000 times higher power density than that common in OLED displays. Alternatively, a uniform film (i.e. not pixelated) of an organic semiconductor laser structure could be employed using selective optical pumping to drive lasing at different locations in the focal surface of the Tx lens. This particular implementation might essentially use the Tx lens for angular magnification of a separate laser source that is steered across the focal surface.

In another disclosed variant, light from a single light source such as a laser or a collection of lasers can be distributed across the focal surface by diffraction, dispersion, beam steering or waveguiding structures. This particular implementation can utilize a dispersive or scattering material or element at the focal surface of the imaging lens assembly to facilitate collection by and transmission through the lens assembly. Some of these implementations are amenable to active modulation of light at the focal surface, whereas others can modulate light away from the focal surface utilizing a mechanism to relay an encoded optical signal to the focal surface.

Figure 5:
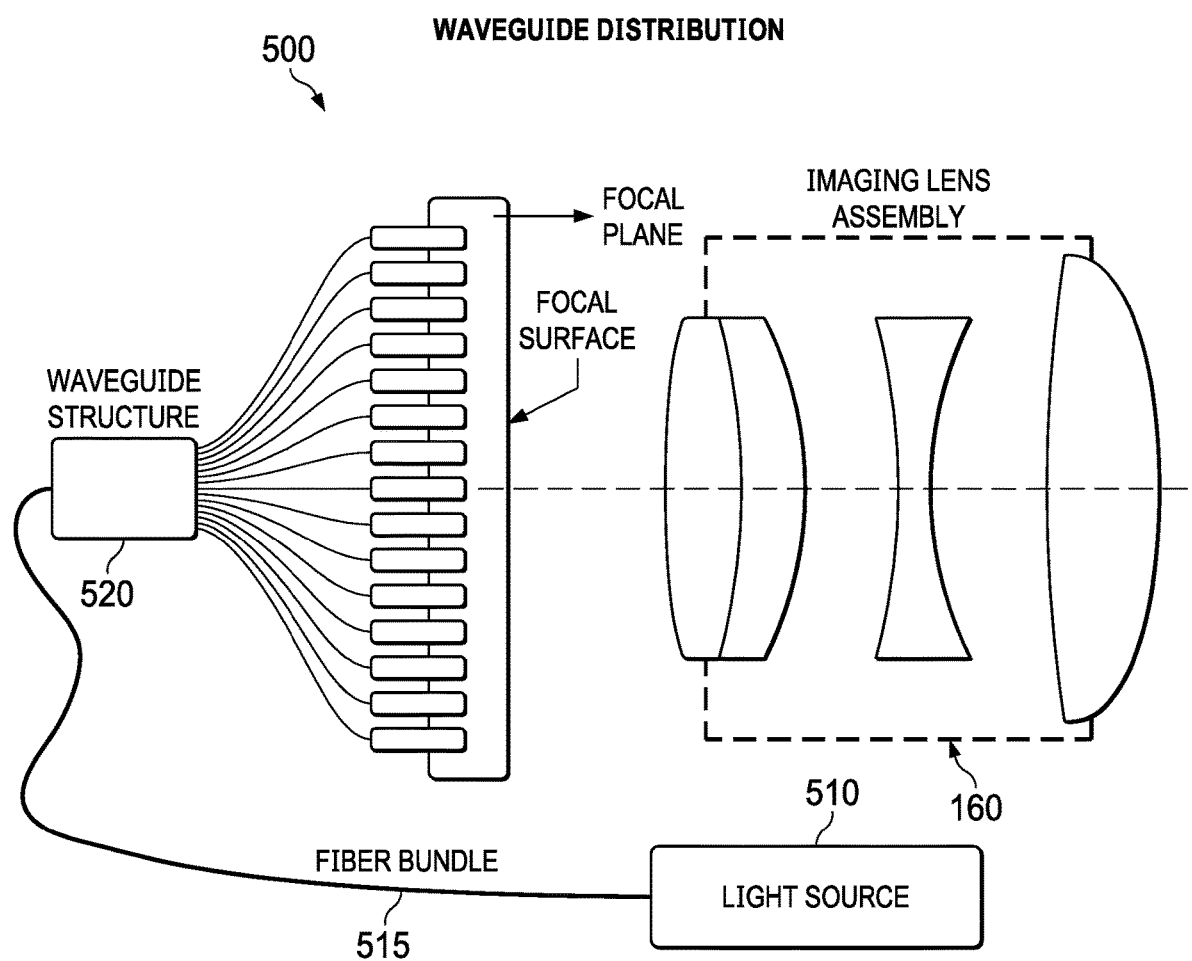
FIG. 5 shows a disclosed imaging Tx having a pixel controller embodied as a waveguide structure.

FIG. 5 shows a disclosed imaging Tx 500 having a pixel controller embodied as a waveguide structure 520 and fiber bundle 515. A light source 510 is shown coupled by a fiber bundle 515 to the waveguide structure 520. The light source 510 will generally be a single multi-wavelength source that is routed into different spatial channels at the waveguide structure 520. This routing may utilize a grating structure that maps different wavelengths to different channels or it might utilize an optical switch network in the form of a photonic integrated circuit. The light source 510 is generally a modulated light source that provides the light and information (data) needed for communication which can be routed to the waveguide array by fiber bundle 515 and in-coupler grating (not shown). Then the signal can be routed to different waveguides using different routing mechanisms (ex. a Micro electro mechanical system), and out-coupled using different outcoupling methods.

Figure 6:
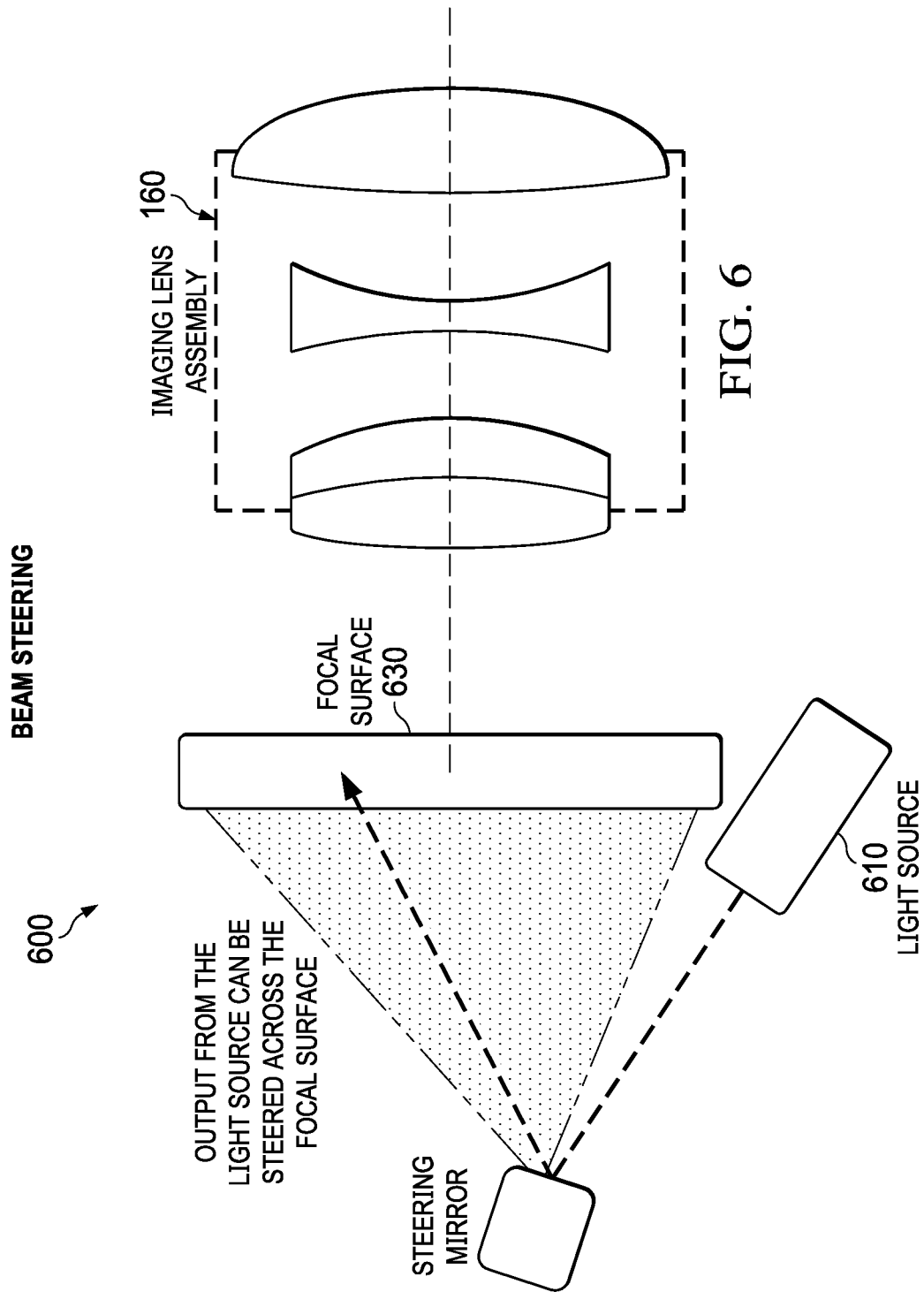
FIG. 6 shows a disclosed imaging Tx having a pixel controller embodied as a beam steering mirror.

FIG. 6 shows a disclosed imaging Tx 600 having a pixel controller embodied as a beam steering mirror. The modulated light source shown as 610 is generally a single light source (rather than an emitter array) that is directed to different locations on the focal surface. Light from light source 610 is incident on the steering mirror 620. The steering mirror 620 steers this light across the focal surface shown as 630. With the steering of the light at different positions across the focal surface 630 resembling light from emitter pixels at different locations as described above. Then the imaging lens assembly 160 collects the steered light and maps it into the image space.

Figure 7:
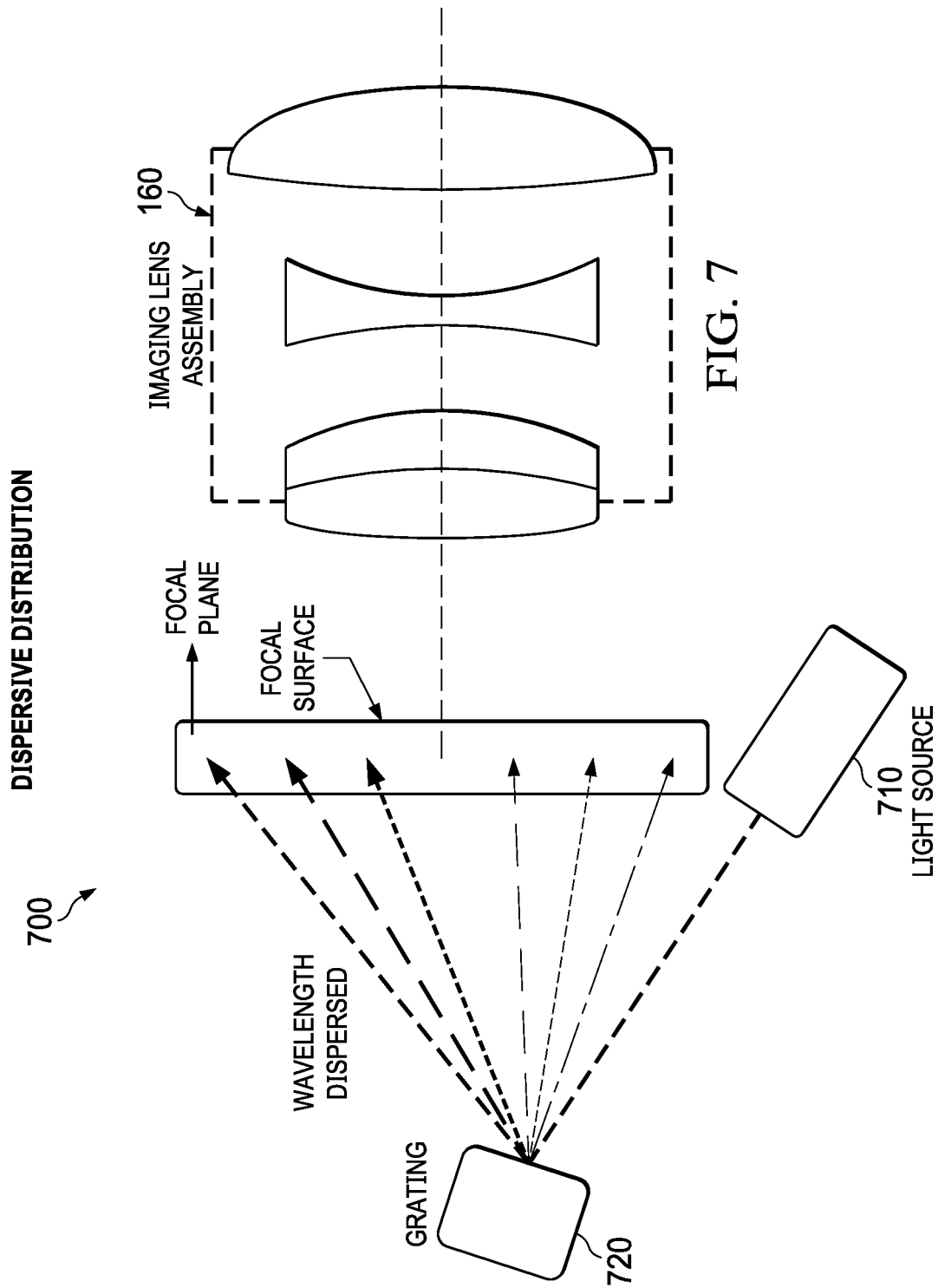
FIG. 7 shows a disclosed imaging Tx having a pixel controller embodied as a grating.

FIG. 7 shows a disclosed imaging Tx 700 having a pixel controller embodied as a grating 720. The grating 720 disperses the various wavelengths of light from a light source 710 that is a generally single source that is dispersed into an array of spots covering the focal plane of the focal surface shown as 730. Since in the Bragg condition the dispersion angle is different for each wavelength of the incident light (provided by light source 710) onto grating 720, the grating 720 separates the different wavelengths from the light source 710 and sends them into different directions. When the different wavelengths reach to various locations in focal surface of the focal plane, they can be collected by the imaging lens assembly 160 and steered to different LOS.

EXAMPLES

Disclosed embodiments of the invention are further illustrated by the following specific Examples, which should not be construed as limiting the scope or content of this Disclosure in any way.

Figure 8:
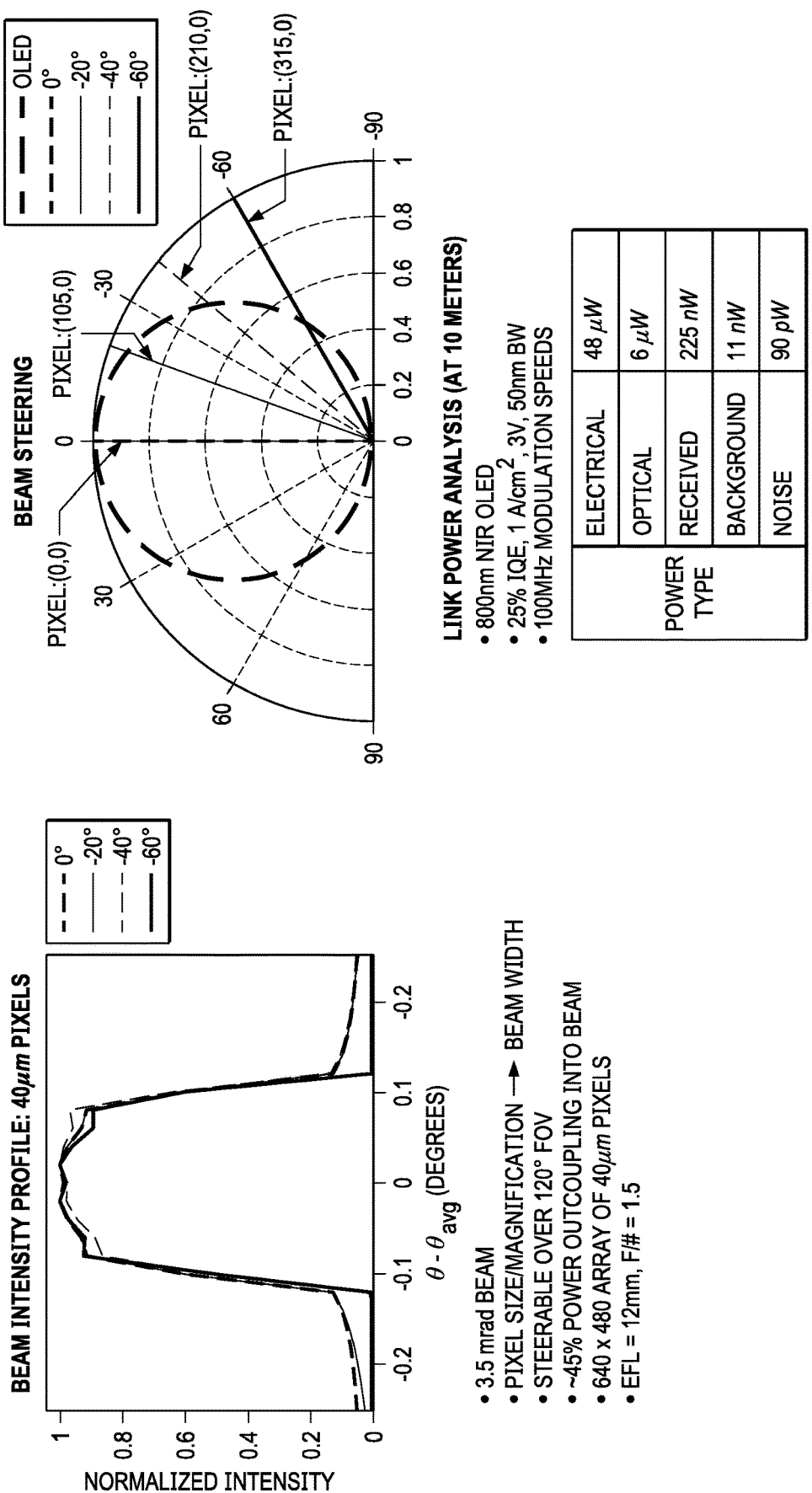

Results from optical modelling of an example imaging Tx comprising a 640×640 OLED emitter array with 40 micron pixels emitting between 775 nm and 825 nm, with 25% internal quantum efficiency and 100 MHz modulation bandwidths are shown in FIGS. 8 and 9. For this analysis, the OLED array is assumed to be fabricated onto a spherically curved surface and integrated with a monocentric lens assembly comprising two glass compositions and a central aperture as illustrated in FIG. 9. The apex of the OLED array is centered at z=0 and exact ray paths from the pixel located at array position (x,y)=(0,315) are shown. Only rays that clear the central aperture are shown, and vignetted rays are not illustrated.

While not resolved on the scale of FIGS. 8 and 9, ray tracing is performed from 11 point sources with Lambertian emission profiles to simulate the finite size of the 40 micron pixel. This can be important, because the divergence of the transmitted FOC (output) beam in a well-corrected optical system is not dominated by aberrations, but instead by the non-zero size of the emissive pixel given by $a_{tx}=d_{pix}/2f$, $a_{tx}$ is the beam divergence (half) angle, $d_{pix}$ (is the diameter of the pixel and f is the focal length of the optical system.

Figure 10A:
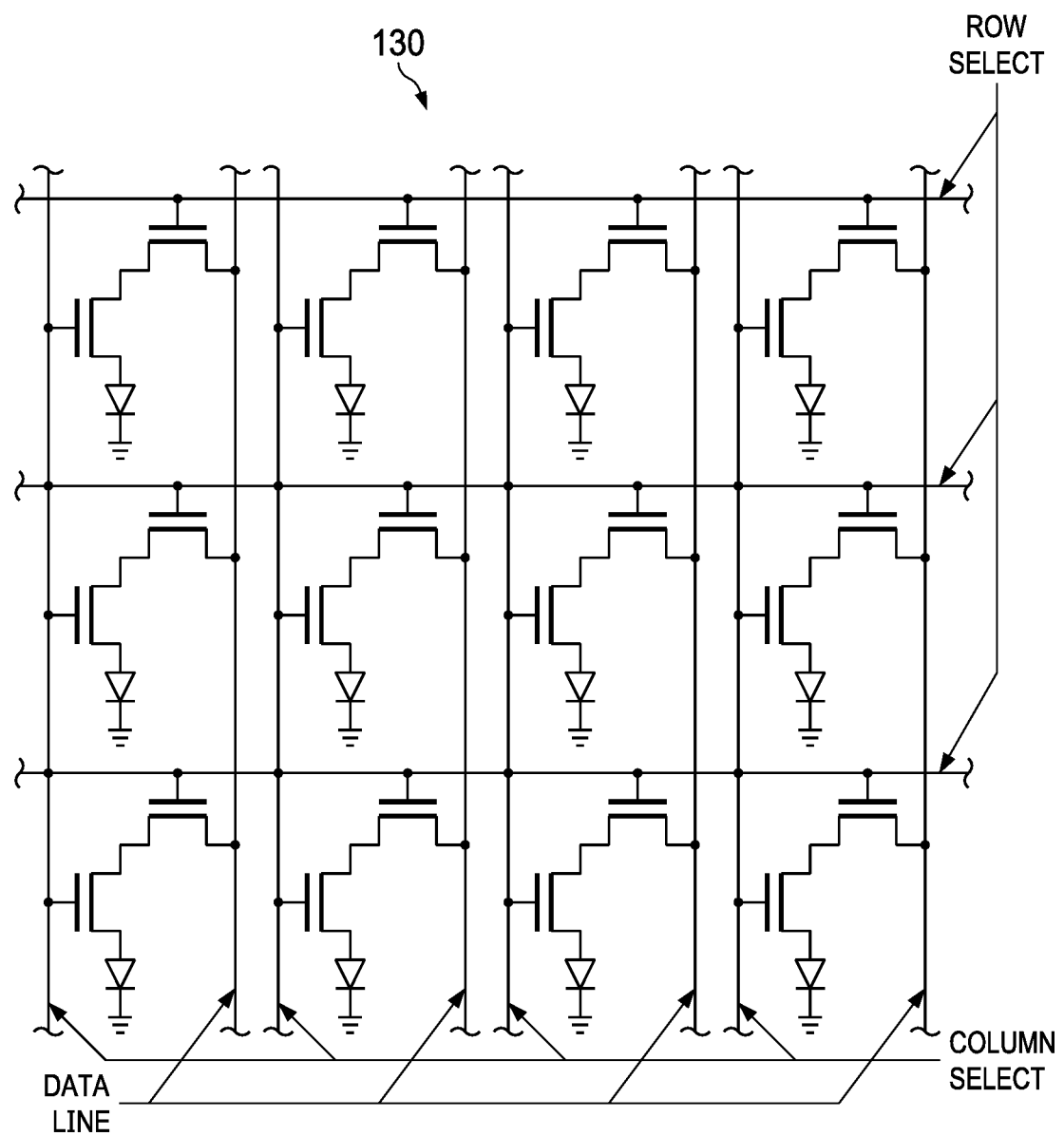
FIGS. 10A and 10B provides a schematic example of clustering for a small subset of an Rx or Tx array where in FIG. 10B 8 pixels are shown dedicated to one channel to form an elliptical-like beam, where 1 pixel is shown dedicated to a second channel to form a minimum-size beam, and 16 channels are shown dedicated to a third channel to form a large square-like beam.

As described above, the emitter array 130 level electronics should generally, at a minimum, generally provide dynamic routing of communications data associated with one or more channels to different pixels in the array. A small subset of 3×4 pixels of an example array circuit is illustrated in FIG. 10A that is also shown as described above as emitter array 130 in FIG. 1. This circuit utilizes a simple 2-transistor pixel to provide row and column addressing in to the array to selectively connect column-aligned data lines to a specific pixel in the emitter array 130; a communications channel would be multiplexed in to the corresponding data line. It is noted that the diode element represents the detector for Rx or emitter for Tx even though these elements may be implemented with other transducers such as photoconductors or lasers. More complex circuit designs can be implemented to provide more flexible routing of multiple channels and/or clustering multiple pixels for a single communications channel as described below.

A unique feature of this disclosed system design is that dynamic beam-shaping Tx or iFOV-control Rx can be implemented electronically. Each pixel has a fixed beam divergence (Tx) or iFOV (Rx) and this determines the finest pointing capabilities of the FOC system, and a larger beam divergence or iFOV can be created by utilizing a cluster of adjacent Tx-pixels or Rx pixels for a single channel. The resulting beam or iFOV is the sum of the contributions from the individual pixels.

Figure 10B:
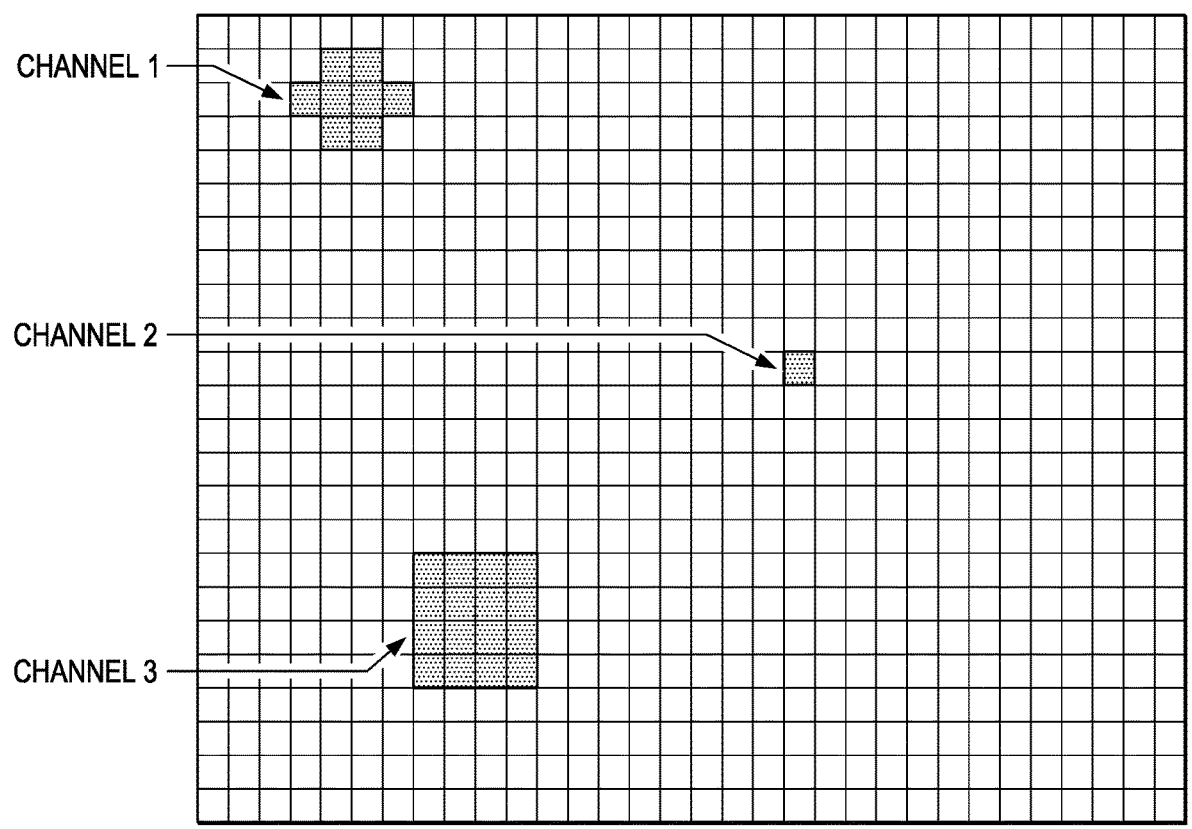

A schematic example of such pixel clustering is shown in FIG. 10B for a small subset of an emitter array. For an imaging TX array 8 pixels of the emitter array is shown dedicated to one channel to form an elliptical-like beam, 1 pixel is dedicated to a second channel to form a minimum-size beam, and 16 pixels are dedicated to a third channel to form a large square-like beam.

Increasing beam or iFOV size by this pixel cluster method could be used to allow larger pointing and tracking errors for dynamically moving transceivers or could be used to facilitate initialization of links with unknown transceivers. As an extreme example of the latter, a search for unknown transceivers could be performed by briefly forming a cluster of all pixels in the emitter array and transmitting a coded message to the cluster that is broadcast into the entire FOR. Note that the receiver FOR can be partitioned into N clusters, where N is the maximum number of available communication channels to expediently locate transceivers. This multinomial search using clusters can be much faster than a pixel level search across the FOR. The clustering of pixels may result in higher power consumption (Tx) or higher background/noise (Rx) proportionate to the number of pixels in the cluster, thus the optimal data link will use as few pixels as possible in a cluster according to the particular system properties, application and operating environment.

Figure 11:
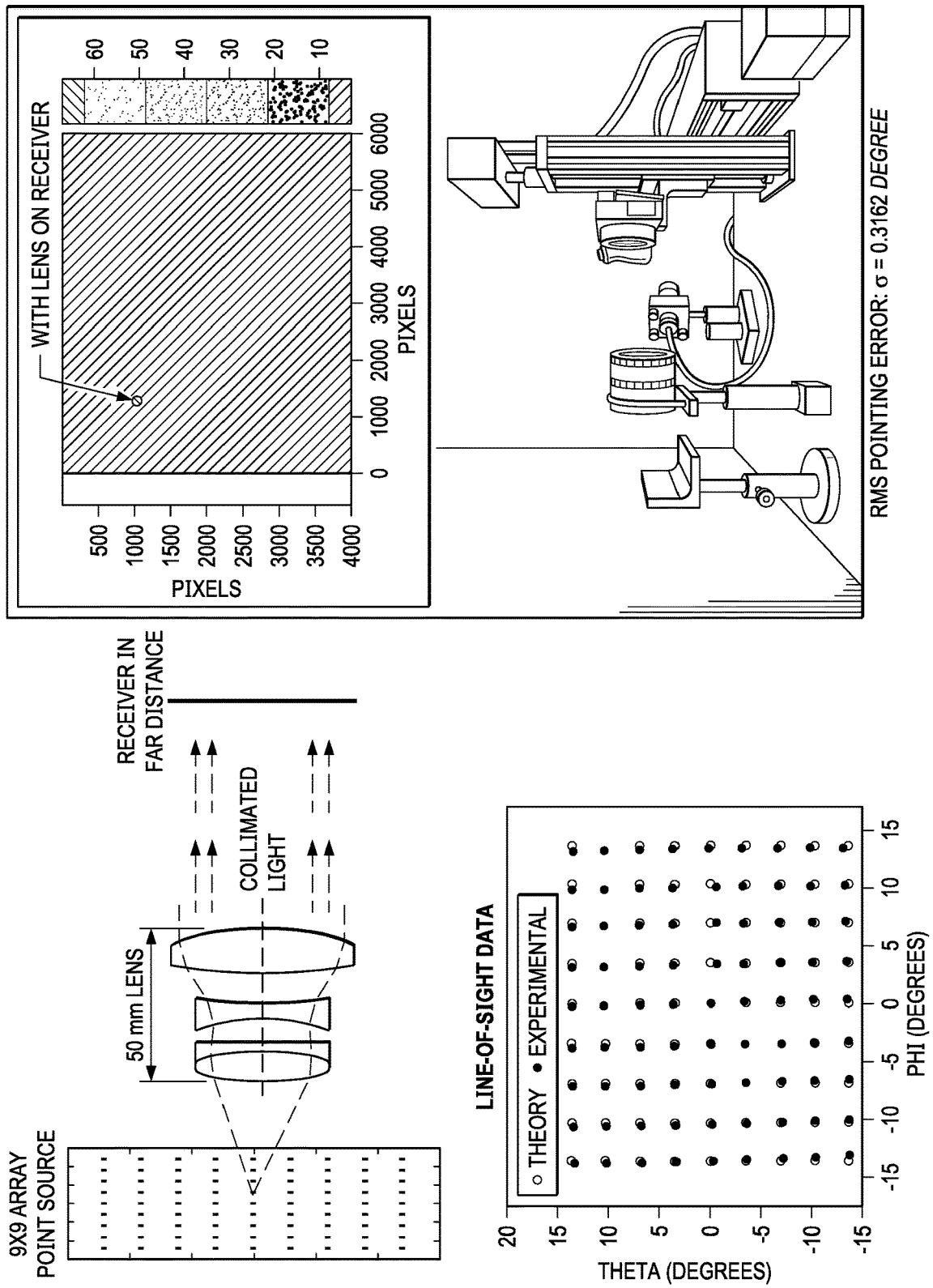
FIG. 11 shows an experimental lab setup comprising commercially available components used for laboratory demos comprising an OLED display from a cellular phone positioned at the focal surface of a 50 mm camera lens with a ~30° FOV. A 9×9 array of point sources were generated on the display distributed in a rectangular grid spanning approximately 1" (inch)×1" (inch) region of the display.

Applicants have performed laboratory demonstrations using commercially available components to demonstrate the basic functionality of disclosed imaging-based beam steering. FIG. 11 shows an experimental setup which comprises an OLED display from a cellular phone positioned at the focal surface of a 50 mm camera lens with a ~30° FOV.

A 9×9 array of point sources were generated on the display distributed in a rectangular grid spanning approximately 1" (inch) 1" (inch) region of the display. These 81 point sources were turned on one-by-one by loading one out of 81 images onto the display and the emitted light collected, collimated and steered by the camera lens was recorded with a Sony A6000 digital camera mounted on a computer controlled 2-axis stage. The transmitted beam profile was recorded directly on the image sensor and, separately, the concentrated signal that would be received by an imaging receiver was measured by installing the lens on the digital camera.

Figure 12:
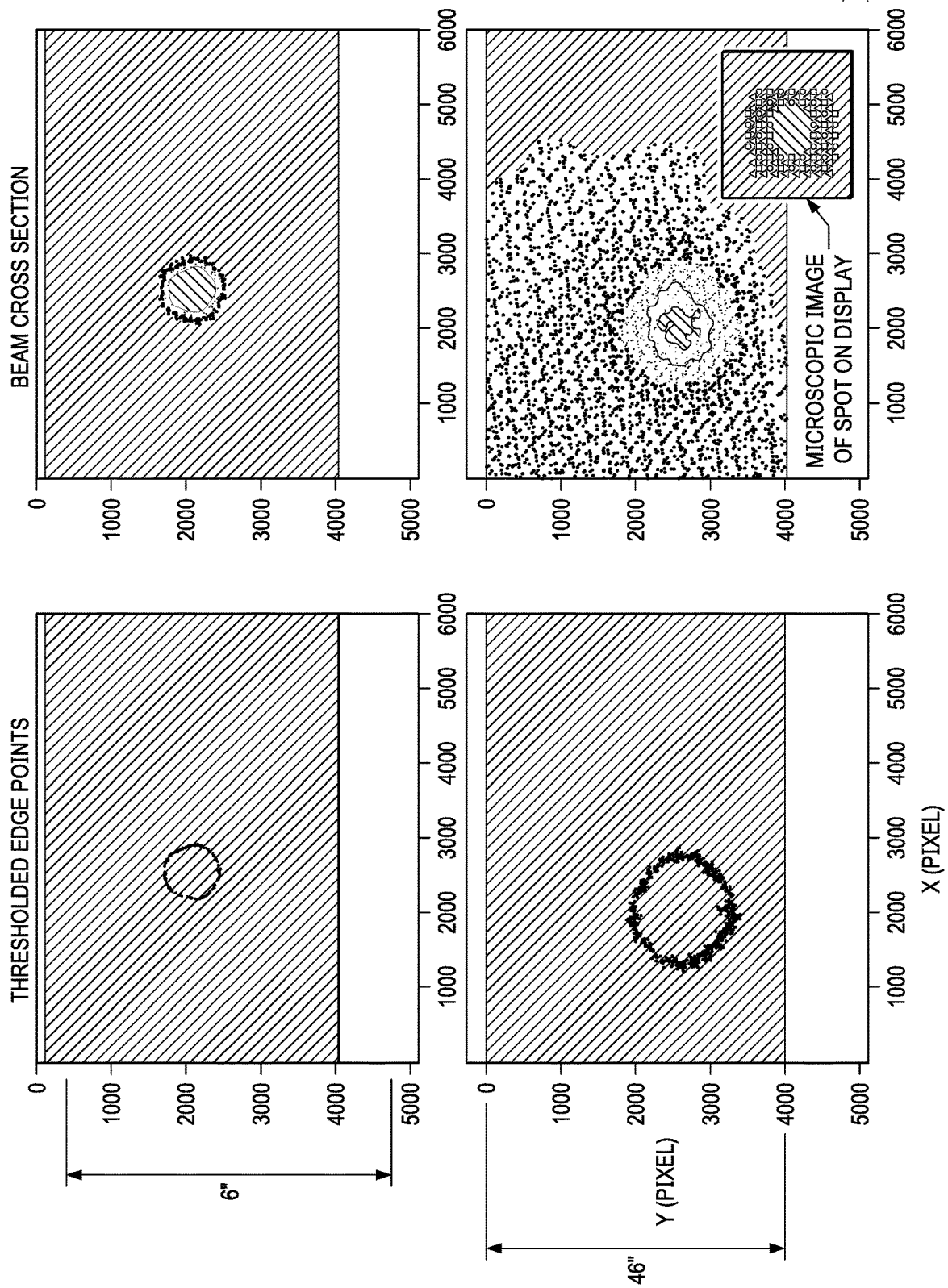
FIG. 12 shows sample results at 6" and 46" distance, where the beam divergence was determined to be 1.3 mrad, consistent with expectations using this spot size ~250 microns and focal length. It is noted that the structure observed at the longer distance is due to imaging the structure of pixel which is not uniform source. A microscope image of the white "point" source is shown in the inset where the emission from individual red, green and blue pixels is resolved.

The LOS produced by each spot was measured by recording the beam at a distance of 15 cm, using a centroid algorithm to find the geometric center of the beam and converting to angular coordinates. Beam divergence was measured by recording the beam cross-section at different distances and computing an RMS value for the distance to the beam perimeter. Sample results at 6" and 46" distance are shown in FIG. 12, where the beam divergence was determined to be 1.3 mrad, consistent with expectations using this spot size ~250 microns and focal length. It is noted that the structure observed at the longer distance is due to imaging the structure of pixel which is not uniform source; a microscope image of the white "point" source is shown in the inset where the emission from individual pixels generally being red, green and blue pixels may be resolved.

Below is described an evaluation of power coupling by exact ray tracing to account for aberrations in real lens designs. The Inventors did this experiment in the context of a rectilinear 50 mm EFL lens with 30° FOR similar to a lens used in prototype (shown below as 'A") and a 100° fish-eye lens scaled to various focal lengths (shown below as 'B').

A. A 50 mm Lens with a 30° FOR

The outcoupling efficiency ($\eta OC$) of a disclosed transmitter was measured to be $\eta OC$=4.1%. This low efficiency can be understood by inserting the Lambertian emission profile $W(\beta)=\cos(\beta)/2\pi$ into an integral equation which expresses $\eta OC$ as a double integral of the LOS elevation angle $\phi$ from zero to $\beta$ max and $\beta$ from 0 to 2 pi of W ($\beta$) sin ($\beta$) $\beta$ d$\phi$, where W is normalized to emission into $2\pi$ steradians of a hemisphere and $\beta$ is the angle from zenith to get $\eta OC$=sin 2 ($\beta$max), where $\beta$max is the max ray angle collected by the entrance pupil of LTx. The efficiency is geometrically limited to $\eta OC$=7.1% for an F/1.8 lens corresponding to $\beta$max=15.5°. It is noted that this Equation does not consider additional losses from vignetting and Fresnel reflections through the lens. The measured value agrees well with the theory considering these additional losses and experimental error measuring the beam power and total radiant flux from the spot.

Figure 13B:
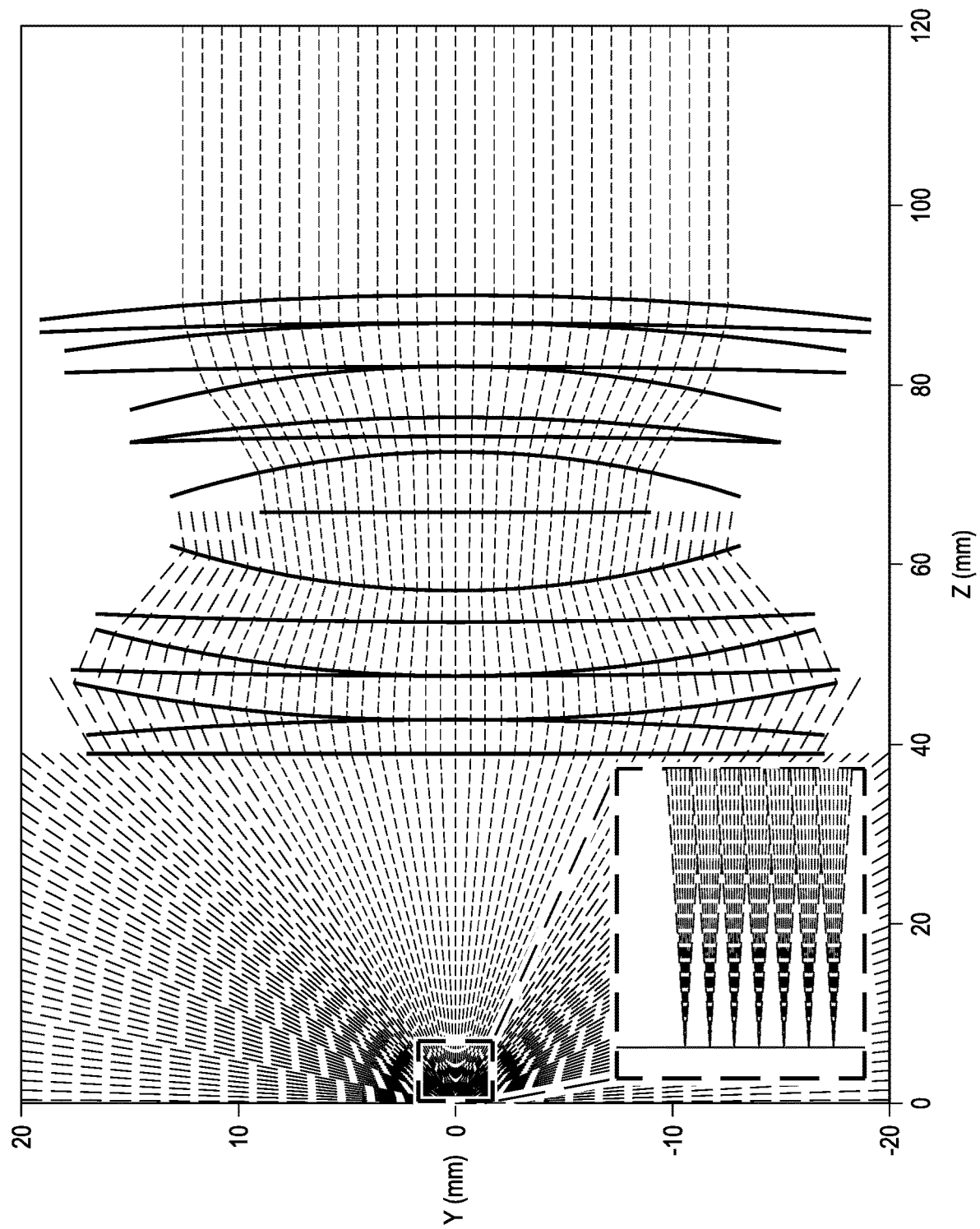
FIG. 13A is a ZEMAX (Zemax is a commonly used optical design program for Microsoft Windows sold by American company Zemax LLC) model of a lens comparable to the transmitter lens (EFL=50 mm, F/1.8, FOV=30°). All rays shown are emitted within the acceptance cone of the entrance pupil, but some rays are truncated by vignetting, especially beyond the ±15° FOV of the lens. 13B is an exact ray tracing from a 200 μm Lambertian emitter located on the optical axis shows rays outcoupled and vignette by the Tx lens. In the inset are seven point sources shown out of 25 distributed across the emitter area during ray tracing.
FIG. 13C shows the variation in beam divergence, outcoupling efficiency, and φ LOS for emitting pixels located at different heights from the axis.

In a simplified analysis it may be assumed the spot is centered on the axis of LTx, and the Inventors expect less-efficient coupling toward the array perimeter where the central ray is increasingly skewed from the axis. To quantify this along with vignetting and aberrations in LTx, The Inventors analyzed a comparable 50 mm EFL rectilinear lens disclosed in U.S. Pat. No. 8,427,762B2, lens 6. However, the inventors used a comparable lens because the prescription of the Canon lens was not available. FIG. 13A shows 2D ray tracing of the wide-angle emission from a Lambertian source located at the axis and highlights rays transmitted through the lens in red; the remainder are not accepted by the entrance pupil.

Rays were traced from a 200 μm wide pixel using 25 Lambertian point sources uniformly distributed along its width; the inset shows an expanded view of only seven point sources across the pixel for clarity. Each ray visible in the figure is a bundle of 25 rays from different subpixel locations, but the low divergence of the system makes these rays indistinguishable at this scale. Tracing these rays into the far field (1 km), one can see these rays diverge and dominate the divergence of the beam indicating that aberrations are negligible in this well-corrected lens. It is noted that the 6.35 μm rms spot size of the lens in the normal photographic configuration (i.e., reversed from that shown in FIGS. 14A, and 14B) is much smaller than a transmitter pixel.

Figure 13C:
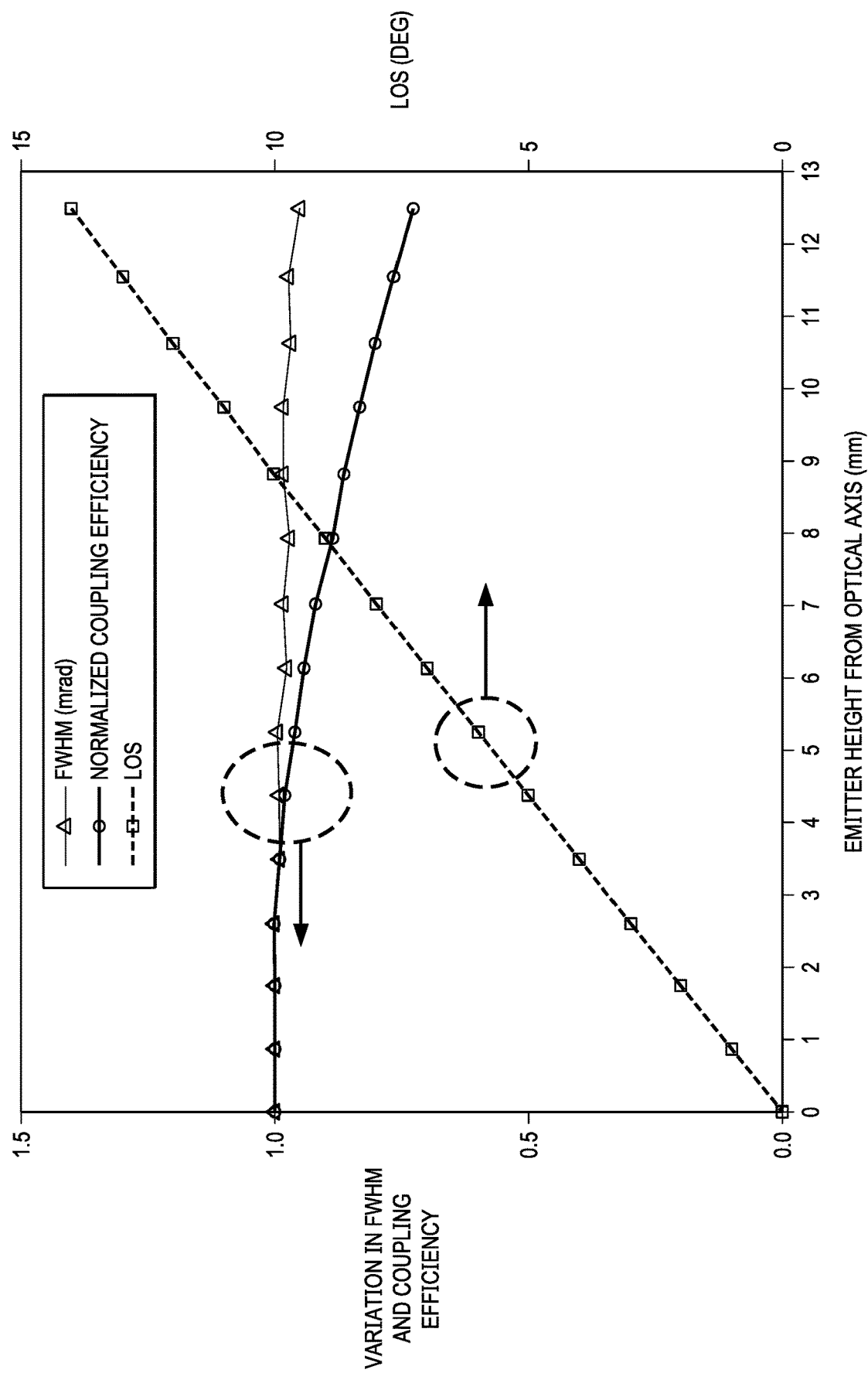

The Inventors used exact ray tracing outlined above for p0,n pixels along x=0 from the axis to yn=12 mm above the axis. Weighting each ray by a Lambertian distribution, the inventors computed the fraction of rays emitted from the lens that lie within the FWHM of the beam. FIG. 13C shows the variation in LOS elevation ($\phi$), FWHM, and outcoupling efficiency $\eta OC$ across the height of the array. Minimal distortion and variation in FWHM are observed. Large skew angles from edge pixels to the center of the entrance pupil result in vignetting of emission and ~30% loss from peak efficiency on axis. A better Tx lens design may utilize a lens with a longer distance to the pupil (i.e., longer than the EFL) in order to reduce the skew angle for edge pixels.

B. 100° Fish-Eye Lens

Figure 14A:
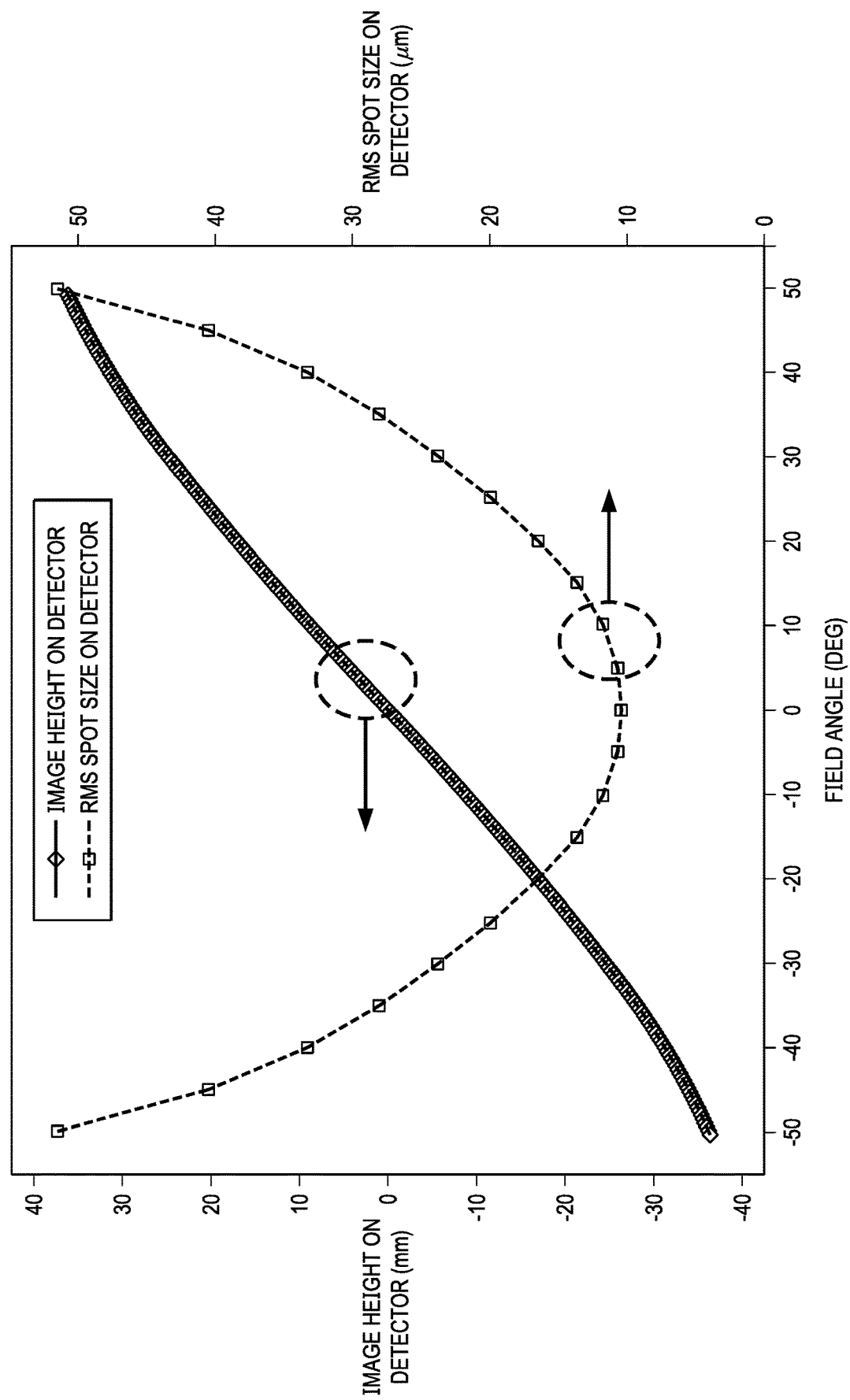
FIG. 14A show spot location and rms spot size for 100° fish-eye lens (EFL=50 mm, F/1.8).

Disclosed FOC transmitters targeted toward mobile applications may use a retrofocus lens, such as a fish-eye, to prioritize wide FOR over range performance. The short focal length and non-rectilinear mapping of such lenses provide a wide FOR but typically incur increased lens volume and optical blur. Here the Inventors evaluated an example 100° FOV fish-eye lens from the ZEMAX database. The original lens design was scaled from EFL=0.732-50 mm and aperture set to F/1.8 to facilitate comparison with the 30° lens. Variation in spot size and image height across the full 100° FOR is shown in FIG. 14A.

Minor distortion is evident toward the edges where the curve deviates from linear; which can be mitigated by updating paraxial approximations reflected in the top, middle and bottom equations copied below.

$$(\theta, \phi)_{m,n} = \left(\tan^{-1}\frac{x_m}{f}, \tan^{-1}\frac{y_n}{f}\right)$$

$$(\Delta\theta, \Delta\phi) = \left(\tan^{-1}\frac{d'_x}{f}, \tan^{-1}\frac{d'_y}{f}\right) \equiv (2a_x, 2a_y)$$

$$(\theta_{FOR}, \phi_{FOR}) = \left(\left(\pm\tan^{-1}\frac{Md_y}{2f}, \pm\tan^{-1}\frac{Nd_y}{2f}\right)\right)$$

In the top equation $\theta$ and $\phi$ are azimuthal and elevation angles of the LOS of an emitter pixel located in $m^{th}$ row and $n^{th}$ column of the emitter array respectively, and the middle equation describes corresponding divergence in azimuthal ($\Delta\theta$) and elevation ($\Delta\phi$) angles. The bottom equation however, describes the field of regards covered by the lens where M and N are number of individual pixels in x and y directions of the emitter array. In these three equations f is focal distance of the lens and values are valid up to first order of analysis. Seidel sums computed in ZEMAX indicate spherical and field-curvature dominate lens aberrations; these drive the ~5× increase in spot size toward the edge. Note that the aberration-limited spot size scales with the focal length and the 50 mm lens have an rms value of ~10 μm on axis. Note that this is larger than the diffraction-limited spot size for this F/1.8 lens but smaller than the 200 μm emitter pixel used in the analysis; so the Inventors expect the beam divergence to follow Eq. (4) described above where $d'_x(d'_y)$ are the width (height) of an emitter pixel.

Figure 14B:
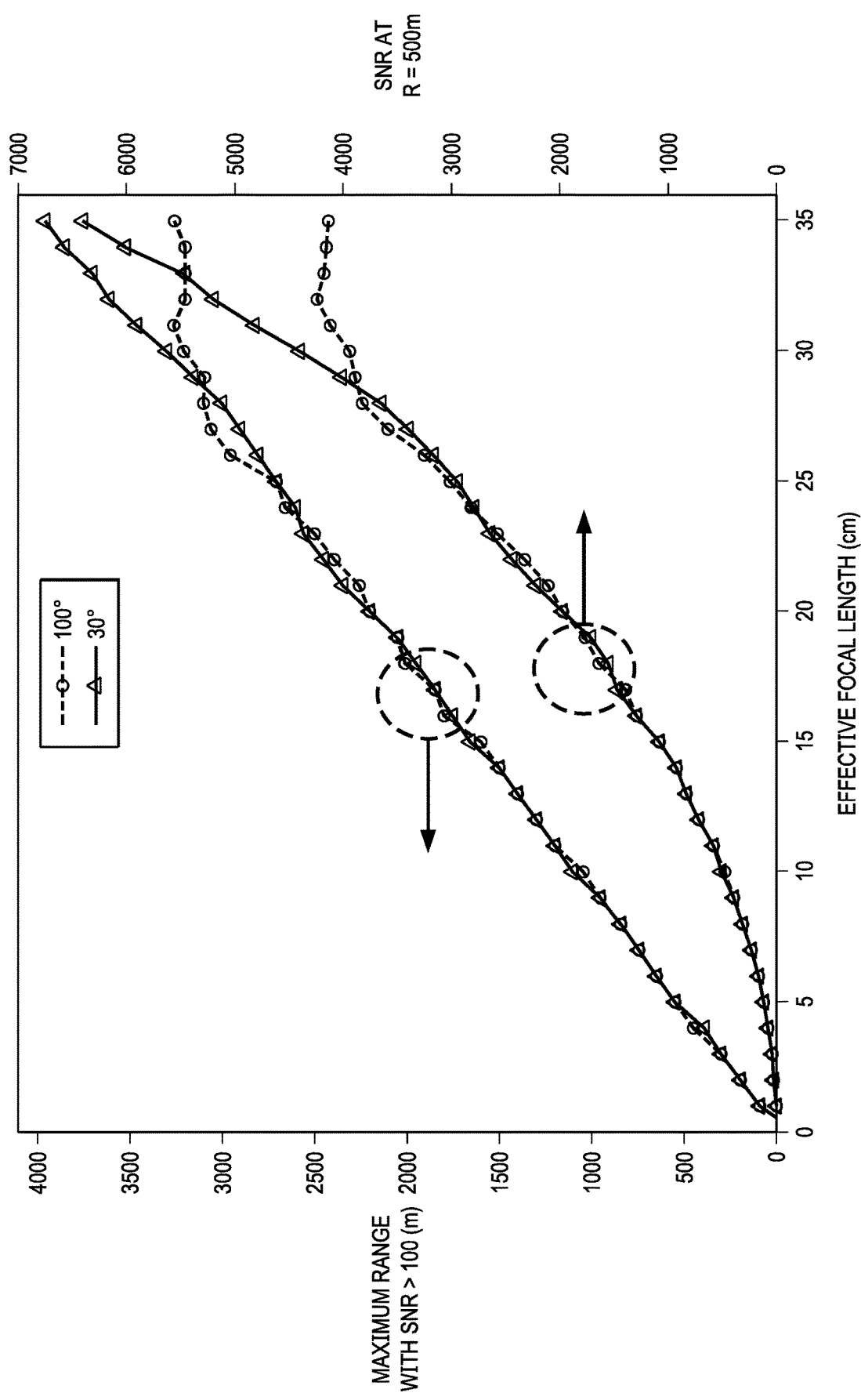
FIG. 14B shows performance of a disclosed FOC system using the 30° (open) and 100° (filled) transmitter lenses scaled to different focal lengths. Maximum range is shown left where the FOC link has a signal-to-noise ratio (SNR) greater than 100. The SNR is shown in FIG. 14B at a range of 500 m (right).

The Inventors performed exact ray tracing to determine outcoupling efficiency and range performance of an FOC link while scaling the lens to different focal lengths. This time the Inventors considered a 200 μm emitter pixel that emits 100 mW at 950 nm uniformly into a 20° emission cone in the normal direction (10° half-angle), corresponding to a large VCSEL pixel. The Inventors observed >99% power coupling into LTx across the 100° FOV in contrast to the inefficient coupling for a Lambertian source. The Inventors assumed an equivalent 50 mm fish-eye lens on the receiver (also F/1.8) to evaluate the power coupling under the assumptions in Section 2 but using exact ray tracing. The Inventors traced rays out of the emitter, through LTx, into a beam that is centered on the receiver entrance pupil and determine the received power using the fraction of rays collected by the receiver. This "signal" power is normalized by 36.9 nW of background radiant flux collected by the iFOV of a 200 μm photodetector at the focal plane in the receiver. The resulting SNR for 500 m separation between the transmitter and receiver is shown in FIG. 14B for the 100° fish-eye and 30° rectilinear lenses scaled to different focal lengths.

The SNR follows a quadratic dependence on EFL through a concomitant reduction of beam divergence in Eq. (4) described above. Note that the SNR saturates for the fish-eye lens at EFL >27 cm because aberrations in the lens begin to dominate the beam divergence as evidenced by the rms spot size increasing beyond the emitter pixel size. In contrast, aberrations in the rectilinear lens remain negligible and increasing the focal length reduces the geometric beam divergence to provide steadily increasing SNR at the receiver. FIG. 14B also shows the maximum effective range for the FOC link assuming an SNR >100 is required for an effective link. Both systems show effective ranges >2 km, while short EFL lenses can provide links over 100s of meters.

Ultimately, system design generally needs to consider eye safety along with operating band, size, cost, and range. For example, eye safety at 950 nm allows~5 mW into the eye; the 100 mW VCSEL output utilized above is distributed over the exit pupil of the transmitter lens, which must be 20× larger than the entrance pupil of the eye (~50 mm2). The system scaled in FIG. 14B is only eye-safe at the transmitter when the lens is scaled >10 cm EFL. Shorter range systems could utilize lower power sources to maintain eye safety in more compact systems.

This expansion of the optical signal to the relatively large aperture of the imaging optic provides a significant advantage over FSOC systems using a small diameter laser beam in terms of eye-safe operation, total beam power, and effective link range. Eye-safe operation is determined by how much beam power can enter the human pupil (~8 mm); when the emitted beam is larger than the pupil only the power density or irradiance (rather than the total beam power) factors into the eye-safety threshold. More power can be safely coupled into a disclosed FSOC beam than a small diameter beam precisely by the ratio of the aperture area of the imaging optic divided by the pupil area. This ratio can readily exceed 100 or more and the range performance increases approximately with the square-root of this ratio for beams with the same divergence; the approximation arises from additional losses due to atmospheric absorption and turbulence that impact range performance.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. An imaging transmitter (Tx), comprising:
one or more light sources for providing modulated light associated with one or more communication channels;
a pixel controller configured for providing the modulated light associated with the one or more communication channels to a plane, wherein the pixel control directs the modulated light associated with each of the one or more communication channels to a different location of the plane; and
an imaging lens assembly, wherein the plane corresponds to a focal plane of the imaging lens assembly, wherein the imaging lens assembly is configured to collimate the modulated light associated with any of the one or more communication channels from the plane as one or more separate free-space optical communications (FOC) beams, wherein each of the one or more FOC beams associated with the one or more communication channels is a collimated beam that emanates from the imaging lens assembly at a different line of sight (LOS) angle based on the associated location in the plane.

2. The imaging Tx of claim 1, wherein the light source comprises an emitter array including a two dimensional (2D) array of directly modulated Tx pixels, and wherein the pixel controller is configured for dynamic selection of at least one emitting pixel from the array of modulated Tx pixels to provide the one or more communication channels, and wherein the modulated Tx pixels are each independently selectable by the pixel controller.

3. The imaging Tx of claim 2, further comprising row-select interconnects aligned along array rows that are configured to activate all the modulated Tx pixels along row and column-aligned data interconnects to allow routing of electrical data signals to the desired ones of the modulated Tx pixels along an activated one or more of the rows.

4. The imaging Tx of claim 2, further comprising at least two select interconnects oriented along rows, columns or diagonals for providing digital signals to activate specific ones of the modulated Tx pixels along a given one of the row, the column or the diagonal.

5. The imaging Tx of claim 2, further comprising at least one selected interconnect for providing analog signals indicating more than 2 levels to activate one or more specific ones of the modulated Tx pixels along a given row, a column, or a diagonal.

6. The imaging Tx of claim 2, wherein the emitter array comprises a 2D array of light emitting diodes (LEDs), organic LEDs, or vertical cavity surface emitting lasers (VCSELs).

7. The imaging Tx of claim 1, wherein the one or more light sources comprise a single light source configured to selectively provide the modulated light associated with any of the one or more communication channels, wherein the pixel controller further comprises an optical element, wherein the pixel controller directs the modulated light from the single light source to a respective location in the plane associated with a selected one of the one or more communication channels via the optical element.

8. The imaging Tx of claim 7, wherein the optical element comprises a waveguide structure, further comprising a fiber bundle between the light source and the waveguide structure.

9. The imaging Tx of claim 7, wherein the optical element comprises a fast steering mirror.

10. The imaging Tx of claim 7, wherein the optical element comprises an optically dispersive element.

11. The imaging Tx of claim 2, further comprising a beam-splitter between the emitter array and the imaging lens assembly.

12. The imaging Tx of claim 2, further comprising a fast steering mirror between the imaging lens assembly and the emitter array.

13. A free-space optical communications (FOC) system, comprising:
a first FOC node having an imaging transmitter (Tx), the imaging Tx comprising:
a light source for providing modulated light;
a pixel controller configured for dynamic selection of at least a portion of the modulated light to provide at least one pre-collimated free-space optical communications (FOC) beam, and
an imaging lens assembly for collimating the pre-collimated FOC beam to provide a transmitted FOC modulated beam;
wherein the pixel controller controls a location of the pre-collimated FOC beam with respect to the focal surface of the imaging lens assembly so that the transmitted FOC modulated beam is projected into the desired direction in object space determined by the location, and
a second FOC node remotely located from the first FOC node including at least an imaging receiver (Rx) positioned to receive the transmitted FOC modulated beam, the imaging Rx comprising:
a photodetector array including a two dimensional (2D) array of photodetector pixels,
a detector pixel controller configured for dynamic selection of at least one detection pixel from the photodetector pixels; and
a detector imaging lens assembly for focusing the FOC beam received from a certain direction onto a pixel at a conjugate location in a focal plane of the detector imaging lens assembly.

14. The FOC system of claim 13, wherein both the first FOC node and the second FOC node both include the imaging Tx and the imaging Rx.

15. The FOC system of claim 13, wherein the light source comprises an emitter array including a two dimensional (2D) array of directly modulated Tx pixels, and wherein the pixel controller is configured for dynamic selection of at least one emitting pixel from the array of modulated Tx pixels to provide the pre-collimated FOC beam, and wherein the modulated Tx pixels are each independently selectable by the pixel controller.

16. The FOC system of claim 15, wherein the emitter array comprises a row select line for receiving a row select signal, and a column select line for receiving a column select signal, and wherein the pixel controller comprises control electronics coupled to the emitter array for providing the row select signal and the column select signal.

17. The FOC system of claim 13, further comprising a non-movable optical element, wherein the pixel controller is coupled to control the optical element for defining the pre-collimated FOC beam by selectively transmitting only a portion of modulated light to reach the imaging lens assembly.

18. The FOC system of claim 17, wherein the light source consists of a single light source, and wherein the optical element comprises a waveguide structure, further comprising a fiber bundle between the single light source and the waveguide structure, wherein the optical element comprises a beam steering mirror or a grating.

* * * * *